(12) United States Patent
Ludvik et al.

(10) Patent No.: US 9,133,337 B2
(45) Date of Patent: Sep. 15, 2015

(54) METHODS FOR MAKING POLYMER PARTICULATES IN GEL FORM

(71) Applicant: Georgia-Pacific Chemicals, LLC, Atlanta, GA (US)

(72) Inventors: Joseph F. Ludvik, Midlothian, VA (US); Xing Dong, Decatur, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 245 days.

(21) Appl. No.: 13/763,561

(22) Filed: Feb. 8, 2013

(65) Prior Publication Data

US 2013/0211005 A1    Aug. 15, 2013

Related U.S. Application Data

(60) Provisional application No. 61/597,118, filed on Feb. 9, 2012.

(51) Int. Cl.
*C08L 71/00* (2006.01)
*C08F 2/22* (2006.01)

(52) U.S. Cl.
CPC .. *C08L 71/00* (2013.01); *C08F 2/22* (2013.01)

(58) Field of Classification Search
CPC .............................................. B01J 2219/00247
USPC ......................................... 524/867; 148/206
See application file for complete search history.

(56) References Cited

U.S. PATENT DOCUMENTS

| 2,378,667 | A | * | 6/1945 | Vaala ............................ 525/429 |
| 4,206,095 | A |   | 6/1980 | Wynstra et al. |
| 5,583,162 | A |   | 12/1996 | Li et al. |
| 5,858,055 | A | * | 1/1999 | Jahnke et al. ..................... 71/27 |
| 8,158,556 | B2 |  | 4/2012 | Feaver et al. |
| 8,404,384 | B2 |  | 3/2013 | Feaver et al. |
| 2003/0013804 | A1 | * | 1/2003 | Phillips et al. ................ 524/594 |

(Continued)

FOREIGN PATENT DOCUMENTS

KR    10-2011-0130628 A    12/2011

OTHER PUBLICATIONS

Simpson, W.G. Plastics: Surface and Finish. Published in 1995. p. 117. Excerpt available online: https://books.google.com/books?id=BUipGAKOh3gC&dq=phenol+formaldehyde+stainless&source=gbs_.*

(Continued)

*Primary Examiner* — Michael Pepitone
*Assistant Examiner* — Michael A Salvitti
(74) *Attorney, Agent, or Firm* — Ram W. Sabnis

(57) ABSTRACT

Methods for making polymer particles in gel form via an emulsion and/or suspension process are provided. The method can include preparing a reactant mixture comprising a carrier fluid and a monomer component containing one or more phenolic compounds and optionally one or more crosslinking compounds, a mixture of Maillard reactants, or a combination thereof. The monomer component can polymerize to form the polymer particles in gel form. The reactant mixture can be located within a reactor having one or more inner surfaces in contact with the reactant mixture during polymerization of the monomer component. The one or more inner surfaces limit a release of metal, metal ions, or a combination thereof into the reactant mixture to produce the polymer particles in gel form containing less than 1 wt % metal atoms, metal ions, or a combination thereof, based on the total weight of the polymer particles in gel form.

20 Claims, 5 Drawing Sheets

Example 1

(56) References Cited

U.S. PATENT DOCUMENTS

| | | |
|---|---|---|
| 2004/0054044 A1* | 3/2004 | Bittner et al. ................. 524/261 |
| 2004/0182711 A1 | 9/2004 | Liang et al. |
| 2004/0201567 A1 | 10/2004 | Yu et al. |
| 2006/0078682 A1 | 4/2006 | McDaniel et al. |
| 2007/0167534 A1* | 7/2007 | Coronado et al. .............. 521/64 |
| 2008/0277115 A1 | 11/2008 | Rediger et al. |
| 2009/0301972 A1* | 12/2009 | Hines et al. ................... 210/705 |
| 2010/0048837 A1* | 2/2010 | Martin et al. ................... 526/64 |
| 2010/0092778 A1 | 4/2010 | Watanabe et al. |
| 2010/0256298 A1 | 10/2010 | Wu et al. |
| 2010/0288617 A1* | 11/2010 | Hershkowitz et al. .......... 201/18 |
| 2010/0331179 A1 | 12/2010 | Feaver et al. |
| 2011/0002086 A1* | 1/2011 | Feaver et al. ................. 361/502 |
| 2011/0028599 A1* | 2/2011 | Costantino et al. ........... 523/309 |
| 2011/0120853 A1* | 5/2011 | Chun et al. ...................... 201/18 |
| 2011/0159375 A1* | 6/2011 | Feaver et al. ................. 429/302 |
| 2011/0199716 A1 | 8/2011 | Feaver et al. |
| 2011/0223494 A1 | 9/2011 | Feaver et al. |
| 2012/0081838 A1 | 4/2012 | Costantino et al. |
| 2012/0202033 A1 | 8/2012 | Chang et al. |
| 2013/0209348 A1* | 8/2013 | Ludvik et al. ................. 423/460 |
| 2013/0211005 A1* | 8/2013 | Ludvik et al. ................. 524/876 |
| 2013/0280601 A1* | 10/2013 | Geramita et al. ............. 429/204 |
| 2014/0148560 A1* | 5/2014 | Qureshi et al. ................ 525/472 |
| 2014/0272592 A1* | 9/2014 | Thompkins et al. ....... 429/231.8 |

OTHER PUBLICATIONS

Shaheen A., Al-Muhtaseb, et al; "Preparation and Properties of Resourcinol Formaldehyde Organic and Carbon Gels", Advanced Materials, Jan. 16, 2003, vol. 15, No. 2, pp. 101-114.

Lee, Hae-Joon, et al,; "Synthesis of Resorcinol/Formaldehyde Gel Particles by the Sol-Emulsion Gel Technique", Materials Letters, Apr. 16, 1998, vol. 37, No. 4/5, pp. 197-200.

Hwang, Sung-Woo, et al.; "Capacitance control of Carbon Aerogel Electrode", Journal of Non-Crystalline Solids, Oct. 22, 2004, vol. 347, Issues 1-3, pp. 238-245.

International Search Report and Written Opinion of the International Searching Authority for PCT/US2013/025448 mailed May 30, 2013.

* cited by examiner

Example 2

Example 3

METHODS FOR MAKING POLYMER PARTICULATES IN GEL FORM

CROSS-REFERENCE TO RELATED APPLICATION

This application claims priority to U.S. Provisional patent application having Ser. No. 61/597,118, filed on Feb. 9, 2012, which is incorporated by reference herein.

BACKGROUND

1. Field

Embodiments described herein generally relate to methods for making resin or polymer particles in gel form. More particularly, such embodiments relate to methods for making resin or polymer particles in gel form that can be further processed into aerogel, xerogel, and/or cryogel particles.

2. Description of the Related Art

Carbon materials such as carbon aerogels, xerogels, and cryogels have been used in a variety of products to improve properties including, but not limited to, electrical conductivity and energy storage in, for instance, supercapacitor applications. Methods for synthesizing carbon aerogels, xerogels, and cryogels on the laboratory scale are known in the art such as converting polymer gel to carbon materials. One particular composition can include, for example, resorcinol and formaldehyde for producing precursor solutions (e.g., a "monomer component" or "sol," which is a solution or a colloidal dispersion of particles in a liquid) that can be further processed into a large monolithic polymer gel or "sol-gel."

The monolithic polymer gels, however, are difficult and expensive to produce and convert into the end product, i.e., aerogel, xerogel, or cryogel. Due to the monolith's large size and low thermal conductivity a significant amount of energy, time, and specialized equipment is required in order to polymerize the monomer component that makes up the monolith structure. Additionally, due to the uneven heating of the monolithic polymer gel as heat is transferred from the outside to the inside thereof, heterogeneous physical differences in the monolithic polymer are formed which can negatively impact the aerogel, xerogel, or cryogel's performance produced therefrom. Furthermore, the large monolithic polymer gel requires physical grinding in order to reduce the monolithic structure into polymer particles in gel form that can then be processed into aerogel, xerogel, or cryogel, which is also labor, capital, and time intensive.

There is a need, therefore, for improved methods for making polymer particles in gel form.

SUMMARY

Methods for making polymer particles in gel form via an emulsion and/or suspension process are provided. In at least one specific embodiment, the method can include preparing a reactant mixture comprising a carrier fluid and a monomer component containing one or more phenolic compounds and optionally one or more crosslinking compounds, a mixture of Maillard reactants, or a combination thereof. The monomer component can polymerize to form the polymer particles in gel form. The reactant mixture can be located within a reactor having one or more inner surfaces in contact with the reactant mixture during polymerization of the monomer component. The one or more inner surfaces limit a release of metal, metal ions, or a combination thereof into the reactant mixture to produce the polymer particles in gel form containing less than 1 wt % metal atoms, metal ions, or a combination thereof, based on the total weight of the polymer particles in gel form.

In at least one specific embodiment, the method for making polymer particles in gel form via an emulsion or suspension process can include preparing a reactant mixture comprising a carrier fluid and a monomer component containing one or more phenolic compounds and optionally one or more crosslinking compounds, a mixture of Maillard reactants, or a combination thereof. The reactant mixture can be directed to a reactor comprising one or more reaction loops. The monomer component can be polymerized within the reactor to form the polymer particles in gel form. The polymer particles in gel form can be recovered from the reactor.

In at least one specific embodiment, the method for making polymer particles in gel form via an emulsion or suspension process can include preparing a reactant mixture comprising a mixture of Maillard reactants and a carrier fluid. The mixture of Maillard reactants can be polymerized to form the polymer particles in gel form.

DETAILED DESCRIPTION

Figure 1:
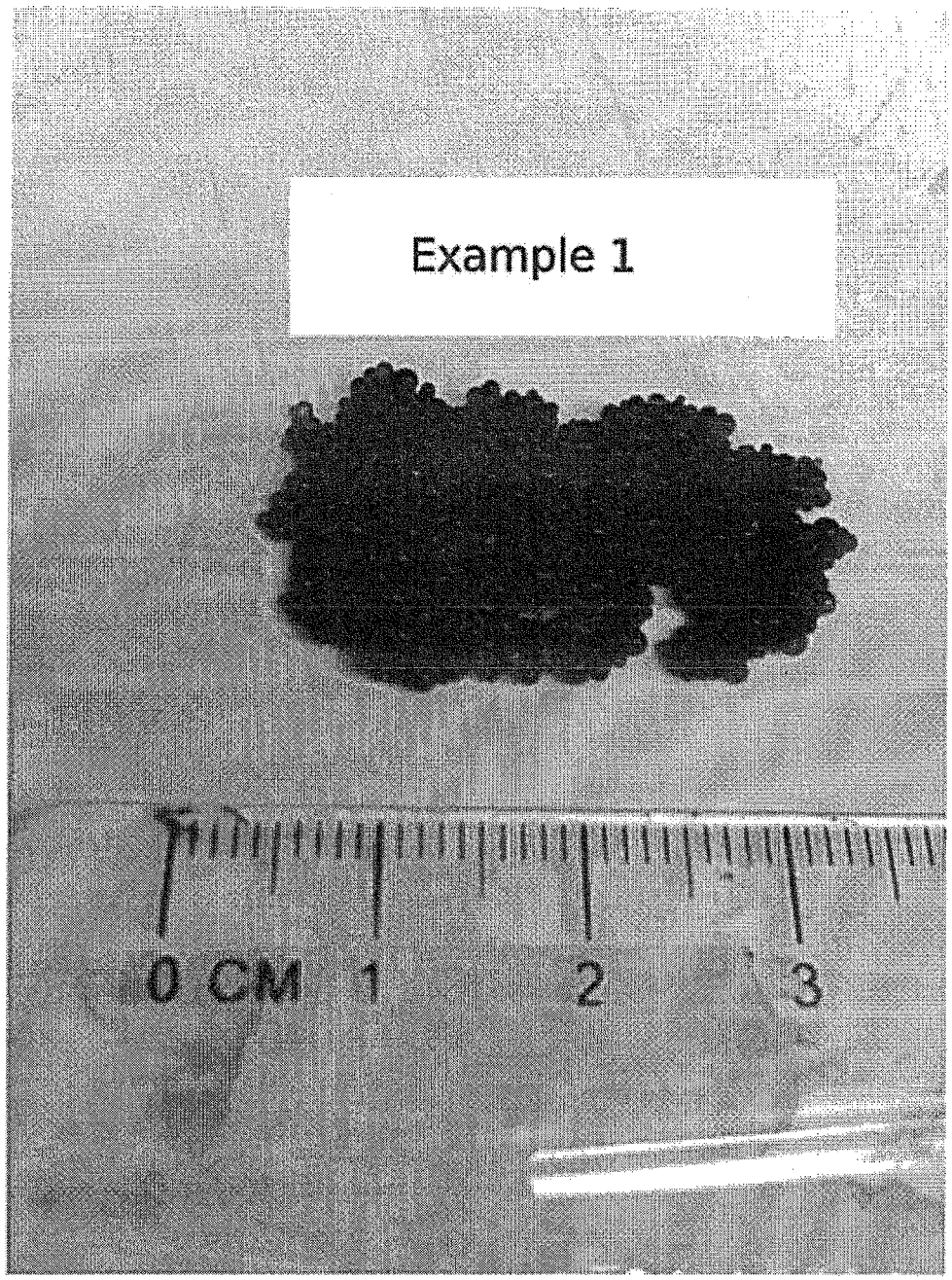
FIG. 1 is a photograph of polymer particles in gel form made according to one or more embodiments described.

Polymer particulates or particles, in gel form, can be produced by polymerizing a monomer component in a suspension and/or emulsion process. In one example, the monomer component can be mixed, blended, or otherwise combined with a carrier fluid or medium to form a reactant mixture that can be in the form of a suspension. In another example, the monomer component can be mixed, blended, or otherwise combined with the carrier fluid or medium to form a reactant mixture that can be in the form of an emulsion. Accordingly, the monomer component, can be mixed, blended, or otherwise combined with a carrier fluid to form the reactant mixture that can be in the form of a suspension and/or an emulsion. In addition to the monomer component, the reactant mixture can also include, but is not limited to, one or more crosslinking compounds and/or one or more catalysts.

The term "carrier fluid" can also be referred to as a suspension fluid, solvent, diluent, dispersion fluid, emulsion fluid, and/or the continuous phase of the suspension and/or emulsion. The polymer particles in gel form can be further processed to produce aerogel, xerogel, and/or cryogel particles, thus avoiding the intermediate production of a monolithic gel structure that requires one or more mechanical processes, e.g., grinding, milling, pulverizing, and the like, to reduce monolithic gel structure into polymer particles.

As used herein, the terms "suspension process," "suspension polymerization process," "dispersion process," and "dispersion polymerization process" are used interchangeably and refer to a heterogeneous polymerization process that uses mechanical agitation to mix the reactant mixture in the carrier or "continuous phase" fluid such as a hydrocarbon and/or water, where the reactant mixture phase and the carrier or continuous phase fluid are not miscible. The reactant mixture can be suspended or dispersed in the carrier fluid or continuous phase as droplets, where the monomer component undergoes polymerization to form particles of polymer and/or curing to form cured particles of polymer.

As used herein, the terms "emulsion process" and "emulsion polymerization process" refer to both "normal" emulsions and "inverse" emulsions. Emulsions differ from suspensions in one or more aspects. One difference is that an emulsion will usually include the use of a surfactant that creates or forms the emulsions (very small size droplets). When the carrier or continuous phase fluid is a hydrophilic fluid such as water and the reactant mixture phase is a hydrophobic compound(s), normal emulsions (e.g., oil-in-water) form, where droplets of monomers are emulsified with the aid of a surfactant in the carrier or continuous phase fluid. Monomers react in these small size droplets. These droplets are typically small in size as the particles are stopped from coagulating with each other because each particle is surrounded by the surfactant and the charge on the surfactant electrostatically repels other particles. Whereas suspension polymerization usually creates much larger particles than those made with emulsion polymerization. When the carrier or continuous phase fluid is a hydrophobic fluid such as oil and the reactant mixture phase is hydrophilic compounds, inverse-emulsions (e.g., water-in-oil) form.

As used herein, the term "monomer component" can include, but is not limited to, one or more phenolic compounds and/or one or more crosslinking compounds; and/or a prepolymer. If the phenolic compound can polymerize and crosslink with itself, the use of the crosslinking compound can be optional. In another example, the phenolic compound and all or a portion of the crosslinking compound can polymerize with one another to form the polymer particles in gel form. In another example, the phenolic compound and the crosslinking compound can react or crosslink with one another to produce the polymer particles in gel form. In another example, the phenolic compound and the crosslinking compound can polymerize with one another and/or crosslink with one another to produce the polymer particles in gel form.

As used herein, the term "prepolymer" refers to the reacted monomer compounds of the one or more phenolic compounds and the one or more crosslinking compounds; and/or a polymer formed by polymerizing the one or more phenolic compounds and/or the one more crosslinking compounds so long as the polymer remains in liquid form.

As used herein, the terms "suspension and/or emulsion process" and "suspension and/or emulsion polymerization" are not limited to or necessarily refer to traditional polymerization. Instead, the terms "suspension and/or emulsion process" and "suspension and/or emulsion polymerization" may, but not necessarily, refer to a curing process or a combination of traditional polymerization and a curing process. As discussed and described herein, in one or more embodiments, the monomer component can be or include a pre-polymer and/or a polymer in addition to or in lieu of the one or more phenolic compounds and/or the one or more crosslinking compounds alone. The curing process refers to the further cross-linking or hardening of the polymer as compared to the polymerization of a monomer mixture. As such, if a pre-polymer is present, the suspension/emulsion process can, in addition to or in lieu of polymerization, also include the curing process. As used herein, the term "curing" refers to the toughening or hardening of polymers via an increased degree of cross-linking of polymer chains. Cross-linking refers to the structural and/or morphological change that occurs in the pre-polymer and/or polymer, such as by covalent chemical reaction, ionic interaction or clustering, phase transformation or inversion, and/or hydrogen bonding.

As used herein, the terms "polymer particulates in gel form" and "polymer particles in gel form" are used interchangeably and refer to a network of polymer chains that have one or more pores or voids therein, and a liquid at least partially occupies or fills the one or more pores or voids. As used herein, the terms "dried polymer particulates" and "dried polymer particles" are used interchangeably and refer to a network of polymer chains having one or more pores or voids therein, and a gas at least partially occupies or fills the one or more pores or voids. If the liquid that at least partially occupies or fills the voids is water, the polymer particles can be referred to as "hydrogel polymer particles."

The components of the reactant mixture, e.g., the monomer component, the catalyst, and the carrier fluid can be combined with one another in any order or sequence. For example, the monomer component can be added to the carrier fluid, the carrier fluid can be added to the monomer component, or the monomer component and the carrier fluid can be simultaneously combined with one another. The catalyst can then be added to the mixture of the monomer component and the carrier fluid.

The individual components of the reactant mixture, e.g., the phenolic compound, the crosslinking compound, and the catalyst, can each independently be mixed, blended, contacted, located, placed, directed, added, disposed, or otherwise combined with the carrier fluid in any order or sequence to produce the suspension and/or emulsion. In other words, one or less than all of the components that make up the monomer component can be combined with the carrier fluid to form or produce an intermediate suspension and/or emulsion. For example, the phenolic compound and the catalyst can be combined with the carrier fluid to form or produce an intermediate suspension and/or emulsion and the crosslinking compound can be combined with the intermediate suspension and/or emulsion to form or produce the suspension and/or emulsion of the reactant mixture and the carrier fluid. In another example, the carrier fluid can be combined with one or more components of the monomer component, e.g., the phenolic compound, to produce an intermediate suspension and/or emulsion and one or more other components, e.g., the cross linking compound, can be added to the intermediate suspension and/or emulsion to produce a second intermediate suspension and/or emulsion. To the second intermediate suspension and/or emulsion the catalyst can be added to produce final suspension and/or emulsion. In other words, the phenolic compound, the crosslinking compound, the catalyst, and/or the carrier fluid can be combined with one another in any order or sequence and/or any two or more components can be simultaneously combined with one another to produce the suspension and/or emulsion.

The suspension and/or emulsion can have a concentration of the monomer component ranging from about 1 wt % to about 90 wt %, based on the combined weight of the monomer component and the carrier fluid. For example, the suspension and/or emulsion can have a concentration of the monomer component ranging from a low of about 10 wt %, about 15 wt %, about 20 wt %, or about 25 wt % to a high of about 40 wt %, about 50 wt %, about 60 wt %, about 70 wt %, about 75 wt %, about 80 wt %, about 85 wt %, or about 90 wt %, based on the combined weight of the monomer component and the carrier fluid. In another example, the monomer component in the suspension and/or emulsion can range from about 25 wt % to about 35 wt %, about 20 wt % to about 45 wt %, about 30 wt % to about 50 wt %, about 10 wt % to about 25 wt %, about 15 wt % to about 50 wt %, about 25 wt % to about 70 wt %, or about 30 wt % to about 60 wt %, based on the combined weight of the monomer component and the carrier fluid.

Prior to forming or producing the suspension and/or emulsion of the monomer component and the carrier fluid, the monomer component or components thereof can be at least partially polymerized with one another to produce a prepolymer. The monomer component can be pre-polymerized at a temperature of from a low of about 20° C., about 25° C., about 30° C., about 35° C., or about 40° C. to a high of about 50° C., about 55° C., about 60° C., about 65° C., about 70° C., about 75° C., about 80° C., about 85° C., about 90° C., about 95° C., or about 100° C. For example, the monomer component can be pre-polymerized at a temperature of about 20° C., about 30° C., about 40° C., about 50° C., about 60° C., or about 70° C. prior to forming the suspension or emulsion. The prepolymer can be mixed, blended, stirred, or otherwise combined with the carrier fluid to form the suspension and/or emulsion. The prepolymer can be added to the carrier fluid, the carrier fluid can be added to the prepolymer, or the prepolymer and the carrier fluid can be simultaneously combined with one another. The prepolymer can be a partially reacted, e.g., polymerized, mixture of the phenolic compound and/or the crosslinking compound, or fully reacted with one another to provide the prepolymer. If the prepolymer is a fully reacted product between the phenolic compound and/or the crosslinking compound the suspension and/or emulsion process can be used to more fully cure or "age" the prepolymer therein or fully cure or "age" the prepolymer therein.

If the prepolymer is formed, the polymerization of the prepolymer can be carried out to an endpoint based on the refractive index of the liquid prepolymer. For example, the prepolymer can be polymerized until the prepolymer has a refractive index ranging from a low of about 1.1000, about 1.2000, about 1.3000, or about 1.3200 to a high of about 1.4500, about 1.4800, about 1.5000, about 1.5500, about 1.6000, about 1.6500, about 1.7000, about 1.7500, or about 1.8000. In another example, the polymerization of the monomer mixture to produce the prepolymer can be carried out to a refractive index of about 1.3500 to about 1.4500, about 1.3800 to about 1.4400, about 1.3900 to about 1.4350, about 1.3900 to about 1.4500, about 1.1000 to about 1.7000, about 1.3000 to about 1.6000, about 1.4200 to about 1.5500, about 1.4800 to about 1.6400, or about 1.3700 to about 1.4300.

In one or more embodiments, the reaction mixture can be agitated. For example, the suspension and/or emulsion can be agitated to improve and/or maintain a homogeneous or substantially homogenous distribution of the reactant mixture within or in the carrier fluid (suspension and inverse emulsion) or a homogeneous or substantially homogenous distribution of the carrier fluid within or in the reactant mixture (suspension and normal emulsion). In one or more embodiments, the reaction mixture is not agitated. The components of the suspension and/or emulsion can be combined within one or more mixers. The mixer can be or include any device, system, or combination of device(s) and/or system(s) capable of batch, intermittent, and/or continuous mixing, blending, contacting, or the otherwise combining of two or more components, e.g., the phenolic compound and the crosslinking compound or the suspension and/or emulsion that includes the monomer component and the carrier fluid. Illustrative mixers can include, but are not limited to, mechanical mixer agitation, ejectors, static mixers, mechanical/power mixers, shear mixers, sonic mixers, vibration mixing, e.g., movement of the mixer itself, or any combination thereof. The mixer can include one or more heating jackets, heating coils, internal heating elements, cooling jackets, cooling coils, internal cooling elements, or the like, to regulate the temperature therein. The mixer can be an open vessel or a closed vessel. The components of the suspension and/or emulsion can be combined within the mixer under a vacuum, at atmospheric pressure, or at pressures greater than atmospheric pressure. In one or more embodiments, the components of the suspension and/or emulsion can be combined within the mixer at a temperature from a low of about 0° C., about 10° C., about 20° C., about 30° C., about 40° C., about 50° C., about 60° C., or about 70° C. to a high of about 90° C., about 100° C., about 110° C., about 130° C., about 150° C., about 175° C., about 200° C., about 225° C., or about 250° C. The mixer can be capable of producing a homogeneous suspension and/or emulsion. In other words, the mixer can produce a suspension and/or emulsion in which the distribution of the monomer component is substantially the same throughout the carrier fluid. It should be noted that an emulsion does not necessarily require any agitation in order to form and/or maintain the emulsion, but such agitation can be used to accelerate and/or improve the homogeneous distribution of the components within the emulsion. As such, if an emulsion alone is formed the emulsion does not necessarily require external energy such as mechanical and/or acoustic energy in order to form and/or maintain the emulsion.

The particular method or combination of methods used to agitate the suspension and/or emulsion can be used, at least in part, as one variable that can be controlled or adjusted to influence the size and/or morphology of the polymer particles in gel form. For example, if a stiffing paddle or blade agitates the suspension and/or emulsion by rotation within the suspension and/or emulsion, the speed at which the stirring paddle or blade rotates can influence the size of the polymer particles in gel form. The particular shape or configuration of the stirring paddle or blade can also influence the size of the polymer particles in gel form.

Once the suspension and/or emulsion forms the monomer component can be polymerized to produce the polymer particles in gel form. As discussed and described above, the suspension and/or emulsion process can also include curing in addition to or in lieu of traditional polymerization. The monomer component can form small droplets or micelles in suspension and/or emulsion. The monomer component, e.g., the phenolic compound, the crosslinking compound, the prepolymer, and/or the polymer contained within the droplets or micelles can undergo polymerization and/or curing to produce the polymer particles in gel form. The liquid that can at least partially fill any pores or voids in the polymer gel particles can be present in the reaction mixture and/or formed during polymerization of the monomer component.

The monomer component can undergo suspension and/or emulsion polymerization within the mixer. The monomer component can be removed from the mixer and introduced into another vessel or container "reactor" in which the suspension and/or emulsion can undergo suspension and/or emulsion polymerization. Illustrative mixers/reactors can include batch, intermittent, and/or continuous type mixers or reactors. A continuous mixer or reactor, for example, can be a "loop" reactor. The suspension and/or emulsion can be formed within other systems, devices, and/or combinations thereof in addition to the one or more mixers discussed and described above. For example, suitable suspension and/or emulsion polymerizations processes can also be carried out under gas phase conditions. For example, the monomer component, the carrier fluid, and/or the optional catalyst can be in the gaseous phase. In another example, the monomer component and the carrier fluid can be in the gaseous phase and the catalyst can be in the solid and/or liquid phase. Accordingly, in one or more embodiments, the reactant mixture or at least one or more components of the reactant mixture can be introduced to the reactor in gas phase. In one or more embodiments, the reactant mixture or at least one or more of the components thereof can be in a liquid phase. In one or more embodiments, the reactant mixture or at least one or more components thereof can be in a solid phase.

Other suitable suspension and/or emulsion processes can be carried out in a continuous process and/or a batch process. Illustrative processes can include, but are not limited to, continuous stirred tank reactor (CSTR), loop reactor, and/or plug flow reactors. The suspension and/or emulsion process can be carried out in one reactor or more than one reactor. When two or more reactors are used the two or more reactor same be the same or different. When two or more reactors are used the two or more reactors can be operated in series and/or parallel. These reactors may have or may not have internal cooling or heating.

Referring to the loop reactor in more detail, the loop reactor can include a circulating slurry or mixture of growing polymer particles in the carrier fluid. The loop reactor can be maintained at a pressure from a low of about 50 kPa, about 101 kPa, about 120 kPa, about 200 kPa, about 400 kPa, about 800 kPa, about 1,200 kPa, about 1,700 kPa, or about 2,100 kPa to a high of about 3,200 kPa, about 3,600 kPa, about 4,100 kPa, about 4,700 kPa, about 5,100 kPa, or about 5,500 kPa. The circulating slurry or mixture of growing polymer particles in the carrier fluid can be at a temperature from a low of about 30° C., about 45° C., about 60° C., about 70° C., about 80° C., or about 90° C. to a high of about 95° C., about 99° C., about 110° C., about 120° C., about 130° C., about 140° C., about 150° C., about 175° C., about 200° C., about 225° C., or about 250° C., for example. Reaction heat can be removed and/or input through the loop wall. The loop wall can be in the form of a double-jacketed pipe. The slurry or mixture can be allowed to exit the reactor at regular intervals or continuously to one or more systems, devices, and/or combination of systems and/or devices capable of separating the polymer particles from the carrier fluid. At least a portion of the carrier fluid can be recycled back to the loop reactor. Additionally, any non polymerized monomer component can be recycled back to the loop reactor. The loop reactor can be used to carry out the suspension and/or emulsion process as a single loop reactor, or two or more loop reactors in parallel and/or series configurations. For example, the loop reactor can include 1, 2, 3, 4, 5, 10, 20, or more loops operated in series and/or parallel. The reactant mixture can be introduced to one or more locations of any given loop reactor. The monomer component or separate compounds of the monomer component can be introduced to any given loop reactor at the same location or different locations with respect to one another. For example, the phenolic compound and the catalyst can be introduced to a given loop reactor at a first location and the crosslinking compound can be introduced to the loop reactor at a second location, where the first and second locations are at the same location on the reactor or where first and second locations are at different locations on the reactor.

In one or more embodiments, if the polymer particles in gel form are produced within the loop reactor (or any other reactor), polymer particles can be removed during, as, and/or within a relatively short time period after being produced, but prior to full cure thereof. For example, the polymer particles can be formed in a few minutes and/or after several minutes or even hours, where the polymer particles have sufficient integrity so that they do not or substantially do not "stick" or "glue" together with one another, but are not fully cured. The separated polymer particles can be introduced to a second vessel, container, or other system, device, and/or combination thereof, where the polymer particles can be further cured. The formation of the polymer particles within the loop reactor can be carried out in a first carrier fluid and when the polymer particles are removed from the loop reactor they can be kept in the first carrier fluid and/or separated from the first carrier fluid and combined with a second carrier fluid. For example, the carrier fluid in the loop reactor (first carrier fluid) can be or include one or more hydrocarbons and the carrier fluid in the second container (second carrier fluid) can be water. The separated first carrier fluid and/or at least a portion of any non-polymerized monomers can be recycled back to the reactor. Accordingly, the formation of the polymer particles in gel form can be carried out in a single vessel or reactor or a plurality of reactors or vessels. Additionally, the formation of the polymer particles in gel form can include the use or combination of different process conditions, e.g., temperature and/or pressure, polymer particle concentration in the carrier fluid (loop reactor as compared to the second vessel), and the like.

The suspension/emulsion process when utilizing liquid components generally can be carried out at a pressure from a low of about 50 kPa, about 101 kPa, about 120 kPa, about 200 kPa, about 400 kPa, about 800 kPa, about 1,200 kPa, about 1,700 kPa, or about 2,100 kPa to a high of about 3,200 kPa, about 3,600 kPa, about 4,100 kPa, about 4,700 kPa, about 5,100 kPa, or about 5,500 kPa or even greater. The suspension/emulsion process can also be carried out at a temperature ranging from a low of about 0° C., about 20° C., about 40° C., or about 50° C. to a high of about 70° C., about 80° C., about 90° C., about 100° C., about 120° C., about 150° C., about 175° C., about 200° C., about 225° C., or about 250° C. Increasing the temperature can reduce the time required to polymerize and/or cure the monomer component to a desired amount. In the suspension/emulsion process particulate polymer can be formed in the carrier fluid.

Depending, at least in part, on the temperature at which the suspension and/or emulsion polymerization is carried out, the monomer component can polymerize and/or cure in a time ranging from about 30 seconds to several hours. For example, the monomer mixture can be polymerized and/or cured in a time ranging from a low of about 1 minute, about 2 minutes, about 3 minutes, about 4 minutes, about 5 minutes, about 10 minutes, about 15 minutes, or about 20 minutes to a high of about 40 minutes, about 1 hour, about 1.5 hours, about 2 hours, about 3 hours, about 4 hours, about 5 hours, about 10 hours, about 15 hours, about 20 hours, or about 24 hours.

The suspension/emulsion process can be carried out under a wide range of pH values. For example, the suspension/emulsion process can be carried out at a pH ranging from a low of about 1, about 2, or about 3 to a high of about 7, about 8, about 9, about 10, about 11, or about 12. In one or more embodiments, the suspension/emulsion process can be carried out under acidic conditions. For example, the pH of the reactant mixture or at least the monomer component can be less than 7, less than 6.5, less than 6, less than 5.5, less than 5, less than 4.5, or less than 4. In another example, the pH of the reactant mixture or at least the monomer component can range from about 1 to about 6.5, about 1.5 to about 5.5, about 2 to about 5, about 1.5 to about 4.5, about 1 to about 4, about 2 to about 4, about 1 to about 3.5, or about 2 to about 4.5.

The particular composition and/or molecular weight of the carrier fluid can be used, at least in part, as one variable to control, adjust, modify, or otherwise influence the size and/or morphology of the polymer particles in gel form. The carrier fluid can have a viscosity at a temperature of 25° C. of from a low of about 1.0 cP, about 3 cP, about 5 cP, about 7 cP, about 10 cP, about 15 cP, about 25 cP, about 40 cP, or about 60 cP to a high of about 100 cP, about 125 cP, about 150 cP, about 175 cP, about 200 cP, about 225 cP, about 250 cP, about 275 cP, about 300 cP, about 400 cP, or about 500 cP. For example, the carrier fluid can have a viscosity at 25° C. from about 2.5 cP to about 200 cP, about 5 cp to about 100 cP, about 10 cP to about 90 cP, about 20 cP to about 80 cP, about 30 cP to about 110 cP, about 40 cP to about 140 cP, or about 2 cP to about 60 cP. In another example, the viscosity of the carrier fluid at 80° C. can be from less than 1 cP to about 100 cP. For example, the carrier fluid at 80° C. can have a viscosity of from a low of about 1 cP, about 2.5 cP, about 5 cP, about 10 cP, about 20 cP, or about 30 cP to a high of about 40 cP, about 50 cP, about 60 cP, about 70 cP, about 80 cP, about 90 cP, or about 100 cP. In another embodiment, the continuous phase can have a viscosity at 80° C. of from about 1 cP to about 75 cP or about 2.5 cp to about 50 cP. In other embodiments, the continuous phase viscosity at 80° C. can be about 5 cP, about 10 cP, about 20 cP or about 30 cP. In another example, the viscosity of the carrier fluid can be adjusted, altered, modified, or otherwise changed during polymerization of the monomer mixture. For example, a carrier fluid having a higher viscosity, e.g., from about 100 cP to about 250 cP at 25° C., can be used during formation of the polymer particles in gel form and a lower viscosity, e.g., from about 1 cP to about 100 cP at 25° C., can be used during separation of the polymer particles from the carrier fluid. In another example, a lower viscosity can be used during formation of the polymer particles in gel form and a high viscosity can be used during separation of the polymer particles in gel form from the carrier fluid. In still another example, the viscosity of the carrier fluid can remain constant or substantially constant, e.g., within about 10% of an initial viscosity, during formation of the polymer particles in gel form and separation of the polymer particle in gel form from the carrier fluid.

The hydrocarbon chain length of the carrier fluid, if a hydrocarbon, (e.g., paraffinic oils) can be varied. The hydrocarbon chain length can influence or otherwise affect one or more properties, e.g., particle size, of the polymer particles in gel form and/or the carbon materials made therefrom. The hydrocarbon chain length of the carrier fluid can be from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. For example, the hydrocarbon chain length of the carrier fluid can be from about 15 carbons to about 40 carbons, about 10 carbons to about 20 carbons, about 10 carbons to about 35 carbons, about 15 carbons to about 50 carbons, about 20 carbons to about 40 carbons, about 20 carbons to about 60 carbons, about 25 carbons to about 35 carbons, about 25 carbons to about 40 carbons, about 25 carbons to about 45 carbons, about 30 carbons to about 40 carbons, about 30 carbons to about 45 carbons, or about 30 carbons to about 50 carbons. In certain embodiments, the hydrocarbon chain length can be about 20 carbons, about 25 carbons, about 30 carbons, about 35 carbons or about 40 carbons. In one or more embodiments, about 50% or more of the carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 60% or more of the carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 70% or more of the carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 80% or more of the carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 90% or more of the carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 100% of the carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons.

The particular mixer and/or reactor design or configuration can also be used, at least in part, as one variable that can be controlled or adjusted to influence the size and/or morphology of the polymer particles in gel form. For example, a reactor within which the suspension and/or emulsion polymerization be carried out in can be or include "rifled" piping or conduits that can be adapted or configured to increase, decrease, and/or maintain a velocity of the suspension and/or emulsion flowing through and across a cross-section of the piping or conduit. The mixer and/or reactor can include zig-zag piping or conduits adapted or configured to increase, decrease, and/or maintain a velocity of the suspension and/or emulsion across and/or through a cross-section of the piping or conduit.

The temperature of the suspension and/or emulsion during the suspension and/or emulsion polymerization can be controlled, adjusted, or otherwise maintained using any one or more processes. For example, heating and/or cooling coils, exchangers, elements and the like can be used to control the temperature of the suspension and/or emulsion. In another example, steam, e.g., superheated steam, or other heated fluids can be injected into, directed toward, or otherwise used to heat the suspension and/or emulsion. In another example, an ultrasonic process heat can be directed toward the suspension and/or emulsion to polymerize the monomer component therein. In still another example, the suspension and/or emulsion can be subjected to a melt spinning process to produce the polymer particles in gel form. In still another example, the suspension and/or emulsion can be subjected to an extrusion process, e.g., an extrusion process similar to fiber production, to produce the polymer particles in gel form. In yet another example, the suspension and/or emulsion can be subjected to a Pastillation process to produce the polymer particles in gel form. In yet another example, the suspension and/or emulsion can be subjected to a drum, oven, grinding "DOG" process with injection molds instead of drums to increase the rate of heat transfer. In another example, the suspension and/or emulsion polymerization can be carried out in an ice-cube like production process in which a plurality of small containers or vessels can be used to contain the suspension and/or emulsion during polymerization. In another example, the suspension and/or emulsion polymerization can be carried out in a marshmallow-like production process.

One or more fluids, e.g., liquid and/or gas, can be injected into the suspension and/or emulsion during the polymerization of the monomer component. For example, carbon dioxide can be directed or otherwise introduced into the suspension and/or emulsion during polymerization to direct, control, or otherwise adjust the structural development of the polymer particles in gel form. The one or more fluids can also be directed or otherwise introduced to the pre-polymer during formation thereof and/or after formation of the prepolymer.

In one or more embodiments, the polymer particles in gel form can contain little or no metal ions, e.g., sodium, iron, lithium, phosphorus, aluminum, arsenic, boron, potassium, or any combination thereof. Impurities such as metal atoms and/or metal ions can be introduced to the polymer particles in gel form via any one or more of several possible sources, which can include, but are not limited to, the particular type of catalyst, leaching from the mixer and/or reactor into the monomer component and/or during and/or after the polymer particles in gel form are made. Accordingly, the materials used to make the mixer, line the inner surfaces or walls of the mixer, and/or components thereof, e.g., agitator blades, reactor, and the like can be chosen so as to reduce the potential or likelihood of contamination. For example, depending on a particular metal, the metal can leach or otherwise loose metal ions that can be incorporated into the polymer particle in gel form during the suspension and/or emulsion polymerization thereof.

The polymer particles in gel form can have a concentration of one or more metal atoms, one or more metal ions, or a combination of one or more metal atoms and one or more metal ions of less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, less than 0.15 wt %, less than 0.1 wt %, less than 0.7 wt %, less than 0.5 wt %, less than 0.3 wt %, less than 0.1 wt %, less than 0.09 wt %, less than 0.07 wt %, less than 0.05 wt %, less than 0.03 wt %, less than 0.01 wt %, less than 0.009 wt %, less than 0.007 wt %, less than 0.005 wt %, less than 0.003 wt %, less than 0.001 wt %, less than 0.0007 wt %, or less than 0.0005 wt %, based on a total weight of the polymer particle in gel form. Similarly, the aerogel, xerogel, and/or cryogel particles can have a concentration of one or more metal atoms, one or more metal ions, or a combination of one or more metal atoms and one or more metal ions of less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, less than 0.15 wt %, less than 0.1 wt %, less than 0.7 wt %, less than 0.5 wt %, less than 0.3 wt %, less than 0.1 wt %, less than 0.09 wt %, less than 0.07 wt %, less than 0.05 wt %, less than 0.03 wt %, less than 0.01 wt %, less than 0.009 wt %, less than 0.007 wt %, less than 0.005 wt %, less than 0.003 wt %, less than 0.001 wt %, less than 0.0007 wt %, or less than 0.0005 wt %, based on a total weight of the aerogel, xerogel, or cryogel particle. The concentration of any metal atoms and/or metal ions present in the particles in gel form, aerogel particles, xerogel particles, and/or the cryogel particles can be measured or determined by proton induced x-ray emission or "PIXE." The metal atom(s) and/or metal ion(s) can be or include the elements having an atomic number from 11 to 92. The metal atom(s) and/or metal ion(s) can be or include elements having an atomic number of 3-5 and 11 to 92.

Individual PIXE impurities may contribute in different ways to the overall electrochemical performance of the disclosed carbon materials. Thus, in some embodiments, the level of sodium present in the carbon material can be less than 1000 ppm, less than 500 ppm, less than 100 ppm, less than 50 ppm, less than 10 ppm, or less than 1 ppm. As noted above, in some embodiments other impurities such as hydrogen, oxygen and/or nitrogen may be present in levels ranging from less than 10% to less than 0.01%.

In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm of any one or more of the metal atoms (or metal ions) having an atomic number of 3 to 5 and/or 11 to 92. For example, in one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm sodium. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm magnesium. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm silicon. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm sulfur. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm calcium. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm iron. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm nickel. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm copper. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm chromium. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm zinc. In some embodiments other impurities such as hydrogen, oxygen and/or nitrogen can be present in levels ranging from less than 10%, less than 9%, less than 8%, less than 7%, less than 6%, less than 5%, less than 4%, less than 3%, less than 2%, less than 1%, less than 0.5%, less than 0.1%, less than 0.05%, or less than 0.01%.

In one or more embodiments, the polymer particles in gel form can contain less than 100 ppm sodium, less than 300 ppm silicon, less than 50 ppm sulfur, less than 100 ppm calcium, less than 20 ppm iron, less than 10 ppm nickel, less than 40 ppm copper, less than 5 ppm chromium, and less than 5 ppm zinc. In one or more embodiments, the polymer particles in gel form can contain less than 50 ppm sodium, less than 100 ppm silicon, less than 30 ppm sulfur, less than 50 ppm calcium, less than 10 ppm iron, less than 5 ppm nickel, less than 20 ppm copper, less than 2 ppm chromium and less than 2 ppm zinc. In one or more embodiments, the polymer particles in gel form can contain less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc. In one or more embodiments, the polymer particles in gel form can contain less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese. In one or more embodiments, the particles in gel form can contain less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, and/or less than 4 ppm uranium, as measured by proton induced x-ray emission. In one or more embodiments, the polymer particles in gel form can contain less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In one or more embodiments, the polymer particles in gel form can contain less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc. In one or more embodiments, the polymer particles in gel form can contain less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc. In one or more embodiments, the polymer particles in gel form can contain less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese. In the context of metal atom and/or metal ion impurities, the aerogel, xerogel, and/or cryogel particle that can be produced from the polymer particles in gel form can also have metal atom and/or metal ion concentrations that correspond to those of the polymer particles in gel form.

One way to reduce and/or eliminate contamination of metal or metal ions within the polymer particles in gel form and/or the aerogel, xerogel, or cryogel particles can be to construct the mixer and/or reactor from non-reactive or very low reactive materials, materials having a reduced or less tendency to leach or give up metal atoms or ions to the reactant mixture as compared to materials that are known to leach metal atoms into the reactant mixture. Some potential materials that can be suitable for making the mixer and/or reactor used to produce the polymer particle in gel form that can also help reduce the contamination of metal ions leaching or otherwise transferring from the mixer and/or reactor to the polymer particles in gel form can include, but are not limited to, metals, glass, e.g., a glass lined vessel, fiber reinforced vessels, e.g., FRP (FRB, FRYE, FRSVE.) and Dual laminate like PP/FRP, PVC/FRP, CPVC/ERP, PVDF/FRP, ECTFE/FRP, ETFE/FRP, FEP/FRP and PFA/FRP, polymer reactors, e.g., Teflon, polyethylene (PE), polypropylene (PP), Chlorinated Poly(Vinyl Chloride) (CPVC). Illustrative metals can include, but are not limited to, cobalt, chromium, tungsten, carbon, silicon, iron, manganese, molybdenum, vanadium, nickel, boron, phosphorous, sulfur, titanium, aluminum, copper, tungsten, alloys thereof, or any combination thereof. For example, the one or more inner surfaces of the reactor can be made of steel such as stainless steels, carbon steels, tool steels, alloy steels, or any combination thereof. Illustrative steels can include, but are not limited to, A387 Grade 11 low chrome steel, 304 stainless steel, 316 stainless steel, and 347 stainless steel.

In one or more embodiments, the surfaces of the mixer and/or reactor and/or components thereof can be treated to reduce the likelihood of metal ions (or other impurities) from leaching or otherwise transferring from the surfaces to the polymer particle in gel form. The inner metal surfaces can be subjected a passivation process to reduce the likelihood of contamination of the polymer particles in gel form with metal ions. For example, metal surfaces of the mixer and/or reactor that contact the suspension and/or emulsion can be subjected one or more treatment processes such as carburization, boronization, and/or nitridization. In another example the inner surfaces of the mixer and/or reactor can be subjected to a pickling process. A pickling process can include treating a metal or other surface to remove one or more impurities, e.g., one or more states, inorganic contaminants, rust or scale from ferrous, copper, and/or aluminum metals or alloys. The surface can be treated with a solution or "pickle liquor" that contains one or more acids, for example. The one or more acids can be or include, but are not limited to, hydrochloric acid, sulfuric acid, nitric acid, or any combination or mixture thereof.

In one or more embodiments, the mixer and/or reactor or inner surfaces thereof can be heated in the presence of a carbon source to a temperature below the melting point of the inner surfaces, but sufficiently high to cause carbon to deposit within the outer layer or surface of the inner surfaces, i.e., the layer or surface exposed to the reactant mixture. Any suitable form of carbon can be used as the carbon source, for example carbon containing gases, liquids, solids, and/or plasmas. Illustrative gases can include, but are not limited to, carbon dioxide, methane, ethane, propane, or the like. In another example, the mixer and/or reactor or/or inner surfaces thereof can be heated in the presence of a boron source to a sufficient temperature, but below the melting point of the inner surfaces, but sufficiently high to cause boron to diffuse into the surface and form borides with the material. In yet another example, the mixer and/or reactor and/or inner surfaces thereof can be heated in the presence of a nitrogen source to a sufficient temperature, but below the melting point of the inner surfaces, causing nitrogen to diffuse into the surface and form nitrides with the material. Any suitable process can be used to nitride the inner surfaces of the mixer and/or reactor and/or other components thereof. For example, gas nitriding, liquid or salt bath nitriding, and ion or plasma nitriding can be used. In another example, the mixer and/or reactor, and/or inner surfaces thereof can under-go both carburization and nitridization ("carbonitriding") in which both carbon and nitrogen are diffused into the inner surfaces thereof. Subjecting the mixer and/or reactor and/or other components and/or inner surfaces thereof to carburization, boronization, and/or nitridization can reduce or eliminate the likelihood that metal ions or other contaminants from the mixer and/or reactor and/or other components thereof can leach or otherwise transfer therefrom to the monomer component, the suspension and/or emulsion, and/or the polymer particles in gel form.

Any two or more components of the suspension and/or emulsion, i.e., the carrier fluid, the monomer component, and/or the prepolymer can be directed or otherwise introduced to the mixer via a stream or pour addition. Any two or more components of the suspension and/or emulsion can be combined with one another via a spray or mist. Any two or more components of the suspension and/or emulsion can be combined with one another via a peristaltic pump. Any two or more components of the suspension and/or emulsion can be combined with one another via subsurface addition. For example, the carrier fluid can be added to the mixer and the monomer component can be directed, added, combined, or otherwise introduced to the carrier fluid in the mixture through one or more ports, nozzles, distribution grids, or the like disposed below a surface of the carrier fluid, above the surface of the carrier fluid, or a combination thereof.

The presence of the catalyst can accelerate polymerization of the monomer component and/or the prepolymer. The suspension and/or emulsion can also be heated to accelerate the polymerization of the monomer component and/or the prepolymer. For example, the suspension and/or emulsion can be heated to an elevated temperature ranging from a low of about 20° C., about 30° C., about 40° C., or about 50° C. to a high of about 70° C., about 80° C., about 90° C., about 100° C., about 110° C., about 120°, about 130° C., about 140° C., about 150° C., about 175° C., about 200° C., about 225° C., about 250° C., or more. For example, the temperature of the suspension and/or emulsion can be maintained, e.g., from about 80° C. to about 99° C., until the suspension and/or emulsion polymerization, i.e., the polymerization between the phenolic compound and the crosslinking compound, reaches a desired degree or level of polymerization. In another example, the temperature of the suspension and/or emulsion can be maintained at a temperature of about 80° C. or more, about 83° C. or more, about 85° C. or more, about 87° C. or more, about 90° C. or more, about 93° C. or more, about 95° C. or more, about 97° C. or more, about 98° C. or more, about 99° C. or more, about 100° C. or more, about 103° C. or more, about 105° C. or more, about 107° C. or more, about 110° C. or more about 112° C. or more, or about 115° C. or more until the suspension and/or emulsion polymerization reaches a desired degree or level of polymerization and/or curing. As noted above, the suspension and/or emulsion process can be carried out under acidic and/or basic conditions. The suspension and/or emulsion polymerization can be conducted until the polymer particles maintain their integrity so that they do not or substantially do not "stick" or "glue" together with one another. The polymerization can be reduced or stopped by decreasing the temperature of the suspension and/or emulsion and/or polymer particles in gel form. The cooled suspension and/or emulsion and/or polymer particles in gel form can be stored for further processing.

The one or more phenolic compounds can be or include substituted phenolic compounds, unsubstituted phenolic compounds, or any combination of substituted and/or unsubstituted phenolic compounds. For example, the phenolic compound can be or include, but is not limited to, phenol, resorcinol, i.e., 1,3-dihydroxybenzene, or a combination thereof. In another example, the phenolic compound can also be or include any compound or combination of compounds, from which resorcinol or any resorcinol derivative can be derived. In another example, the phenolic compound, if present, can be a polyhydroxybenzene, a dihydroxybenzene, a trihydroxybenzene, or any combination thereof. In another example, the phenolic compound can be phenol.

In one or more embodiments, the suitable phenolic compounds can be represented by Formula I:

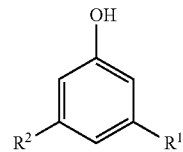

Formula I where R1 and are R2 are independent selected from hydrogen (H), a hydroxy group, C1-5 alkyl, or OR3, where R3 is a C1-5 alkyl or C1-5 aryl, and where at least one of R1 and R2 is a hydroxy group. Other suitable phenolic compounds can be represented by Formula II:

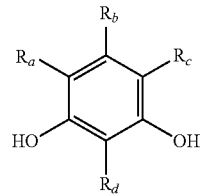

Formula II where each of $R_a$, $R_b$, $R_c$, and $R_d$ is independently hydrogen (H); hydroxy; a halide, e.g., fluoride, chloride, bromide or iodide; a nitro; a benzo; a carboxy; an acyl such as formyl, an alkyl-carbonyl, e.g., acetyl, and an arylcarbonyl, e.g., benzoyl; alkyl such as methyl, ethyl, propyl, butyl, pentyl, hexyl, heptyl, octyl, nonyl, decyl and the like; an alkenyl such as unsubstituted or substituted vinyl and allyl; unsubstituted or substituted methacrylate, unsubstituted or substituted acrylate; silyl ether; siloxanyl; aryl such as phenyl and naphthyl; aralkyl such as benzyl; or alkaryl such as alkylphenyls, and where at least two of $R_a$, $R_c$, and $R_d$ is hydrogen.

Other suitable phenolic compounds can be or include phenol itself (i.e., mono-hydroxy benzene). Other suitable examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bisphenol A and bisphenol F also can also be used. In particular, the phenol component can be selected from the group consisting of phenol; alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol; catechol, hydroquinone, bisphenol A and bisphenol F. Still other suitable phenolic compounds can be or include resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl)ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol or a combination thereof. Another suitable phenolic compound can be or include phloroglucinol.

In at least one example, the phenolic compound can be or include, but is not limited to, phenol, resorcinol, i.e., 1,3-dihydroxybenzene, or a combination thereof. In another example, the phenolic compound can be or include, but is not limited to, any compound or combination of compounds, from which resorcinol or any resorcinol derivative can be derived. In another example, the phenolic compound can be a polyhydroxybenzene, a dihydroxybenzene, a trihydroxybenzene, or any combination thereof. The phenolic compound can include any combination of two or more phenolic compounds combined with one another and/or added independent of one another to the reactant mixture.

Resorcinol can be provided as a white/off-white solid or flake and/or the resorcinol component can be heated and supplied as a liquid. The solids component of a liquid resorcinol-formaldehyde copolymer can range from about 5 wt % to about 95 wt %. For example, the solids component of a liquid resorcinol-formaldehyde copolymer can range from a low of about 5 wt %, about 10 wt %, about 15 wt %, about 20 wt %, about 25 wt %, or about 20 wt % to a high of about 50 wt %, about 55 wt %, about 60 wt %, about 65 wt %, about 70 wt %, or about 75 wt %. In another example, the solids component of a liquid resorcinol-formaldehyde copolymer can range from about 10 wt % to about 75 wt %, about 10 wt % to about 40 wt %, about 30 wt % to about 80 wt %, about 45 wt % to about 75 wt %, or about 15 wt % to about 70 wt %. Liquid resorcinol-formaldehyde copolymers can have a Brookfield viscosity at 25° C. that varies widely. For example, liquid resorcinol-formaldehyde copolymer scan have Brookfield viscosity at 25° C. ranging from a low of about 5 cP, about 50 cP, about 100 cP, about 200 cP, about 400 cP, or about 600 cP to a high of about 1,000 cP, about 2,500 cP, about 5,000 cP, about 10,000 cP, about 15,000 cP, or about 20,000 cP. Liquid resorcinol copolymers typically have a dark amber color.

In one or more embodiments, the phenolic compound can also be or include one or more tannins. As used herein, the term "tannin" refers to both hydrolyzable tannins and condensed tannins. As such, the phenolic compound can be or include hydrolyzable tannins, condensed tannins, or a combination of hydrolyzable tannins and condensed tannins. Illustrative genera of shrubs and/or trees from which suitable tannins can be derived can include, but are not limited to, *Acacia, Castanea, Vachellia, Senegalia, Terminalia, Phyllanthus, Caesalpinia, Quercus, Schinopsis, Tsuga, Rhus, Juglans, Carya,* and *Pinus,* or any combination thereof. In another example, genera from which suitable tannins can be derived can include, but are not limited to, *Schinopsis, Acacia,* or a combination thereof. In another example, genera from which suitable tannins can be derived can include, but are not limited to, *Pinus, Carya,* or a combination thereof.

Hydrolyzable tannins are mixtures of simple phenols such as pyrogallol and ellagic acid and of esters of a sugar, e.g., glucose, with gallic and digallic acids. Illustrative hydrolyzable tannins can include, but are not limited to, extracts recovered from *Castanea sativa,* (e.g., chestnut), *Terminalia* and *Phyllanthus* (e.g., myrabalans tree species), *Caesalpinia coriaria* (e.g., divi-divi), *Caesalpinia spinosa,* (e.g., tara), algarobilla, valonea, and *Quercus* (e.g., oak). Condensed tannins are polymers formed by the condensation of flavans. Condensed tannins can be linear or branched molecules. Illustrative condensed tannins can include, but are not limited to *Acacia mearnsii* (e.g., wattle or mimosa bark extract), *Schinopsis* (e.g., quebracho wood extract), *Tsuga* (e.g., hemlock bark extract), *Rhus* (e.g., sumach extract), *Juglans* (e.g., walnut), *Carya illinoinensis* (e.g., pecan), and *Pinus* (e.g., Radiata pine, Maritime pine, bark extract species).

The condensed tannins include about 70 wt % to about 80 wt % active phenolic ingredients (the "tannin fraction") and the remaining ingredients (the "non-tannin fraction") can include, but are not limited to, carbohydrates, hydrocolloid gums, and amino and/or imino acid fractions. The condensed tannins can be used as recovered or extracted from the organic matter or the condensed tannins can be purified, e.g., to about 95 wt % or more active phenolic ingredients. Hydrolyzable tannins and condensed tannins can be extracted from the starting material, e.g., trees and/or shrubs, using well established processes. A more detailed discussion of tannins is discussed and described in the *Handbook of Adhesive Technology*, Second Edition, CRC Press, 2003, chapter 27, "Natural Phenolic Adhesives I: Tannin," and in *Monomers, Polymers* and *Composites from Renewable Resources*, Elsevier, 2008, chapter 8, "Tannins: Major Sources, Properties and Applications."

The condensed tannins can be classified or grouped into one of two main categories, namely, those containing a resorcinol unit and those containing a phloroglucinol unit. Illustrative tannins that include the resorcinol unit include, but are not limited to, black wattle tannins and quebracho tannins Illustrative tannins that include the phloroglucinol unit include, but are not limited to, pecan tannins and pine tannins.

The crosslinking compound can be or include, but is not limited to, unsubstituted aldehyde compounds and/or substituted aldehyde compounds. Aldehyde compounds suitable for use as the crosslinking compound can be represented by the formula RCHO, where R is hydrogen or a hydrocarbon radical. Illustrative hydrocarbon radicals can include from 1 to about 8 carbon atoms. In another example, suitable aldehyde compounds can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, or any combination thereof. One or more other aldehydes, such as glyoxal can be used in place of or in combination with formaldehyde and/or other aldehydes. In at least one example, the aldehyde compound can include formaldehyde, UFC, or a combination thereof.

The aldehyde compounds can be used as a solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

The crosslinking compound can be or include, but is not limited to, one or more multifunctional aldehyde compounds. As used herein, the terms "multifunctional aldehyde compound" and "multifunctional aldehyde" are used interchangeably and refer to compounds having at least two functional groups, with at least one of the functional groups being an aldehyde group. For example, the multifunctional aldehyde can include two or more aldehyde functional groups. In another example, the multifunctional aldehyde can include at least one aldehyde functional group and at least one functional group other than an aldehyde functional group. As used herein, the term "functional group" refers to reactive groups in the multifunctional aldehyde compound and can include, but is not limited to, aldehyde groups, carboxylic acid groups, ester groups, amide groups, imine groups, epoxide groups, aziridine groups, azetidinium groups, and hydroxyl groups.

The multifunctional aldehyde compound can include two or more carbon atoms and have two or more aldehyde functional groups. For example, the multifunctional aldehyde compound can include two, three, four, five, six, or more carbon atoms and have two or more aldehyde functional groups. The multifunctional aldehyde compound can include two or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group. For example, the multifunctional aldehyde compound can include two, three, four, five, six, or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group.

Suitable bifunctional or difunctional aldehydes that include three (3) or more carbon atoms and have two aldehyde functional groups (—CHO) can be represented by the following formula:

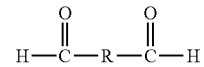

where R is a divalent aliphatic, cycloaliphatic, aromatic, or heterocyclic group having from 1 to 12 carbon atoms. Illustrative multi-functional aldehydes can include, but are not limited to, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, ring-substituted aromatic aldehydes, or any combination thereof. A suitable bifunctional or difunctional aldehyde that includes two carbon atoms and has two aldehyde functional groups is glyoxal.

Illustrative multifunctional aldehyde compounds that include an aldehyde group and a functional group other than an aldehyde group can include, but are not limited to, glyoxylic acid, glyoxylic acid esters, glyoxylic acid amides, 5-(hydroxymethyl)furfural, or any combination thereof. The aldehyde group in the multifunctional aldehyde compound can exist in other forms, e.g., as a hydrate. As such, any form or derivative of a particular multifunctional aldehyde compound can be used to prepare the binder compositions discussed and described herein. For example, in the context of glyoxylic acid, glyoxylic acid, glyoxylic acid monohydrate, and/or glyoxylate can be combined with the tannins and the Lewis acid to produce the binder composition. The crosslinking compound can include any combination of two or more crosslinking compounds combined with one another and/or added independent of one another to the reactant mixture.

In one or more embodiments, the monomer component of the phenolic compound and the crosslinking compound can be partially or completely replaced with a mixture of Maillard reactants. Similarly, the prepolymer can be or include a partially or pre-reacted mixture of the Maillard reactants. In other words, all or a portion of the monomer component of the reactant mixture can be a mixture of Maillard reactants, a pre-reacted mixture of Maillard reactants or a combination thereof. The mixture of Maillard reactants can include, but is not limited to, a source of a carbohydrate (carbohydrate reactant) and an amine reactant capable of participating in a Maillard reaction with the carbohydrate reactant.

The source of the carbohydrate can include one or more reactants having one or more reducing sugars, one or more reactants that yields one or more reducing sugars under thermal curing conditions, or a combination thereof. A reducing sugar can be a sugar that contains aldehyde groups, or can isomerize, i.e., tautomerize, to contain aldehyde groups. Such aldehyde groups are reactive with an amino group (amine reactant) under Maillard reaction conditions. Usually such aldehyde groups can also be oxidized with, for example, $Cu^{+2}$ to afford carboxylic acids. Said another way, the reducing sugar can contain one or more aldehyde moieties that is reactive with $Cu^{+2}$ to produce a carboxylic acid moiety. The carbohydrate reactant can optionally be substituted with other functional groups, such as with hydroxy, halo, alkyl, alkoxy, and the like. The carbohydrate source can also possess one or more chiral centers. The carbohydrate source can also include each possible optical isomer at each chiral center. Various mixtures, including racemic mixtures, or other diastereomeric mixtures of the various optical isomers of any such carbohydrate source, as well as various geometric isomers thereof, can be used.

The carbohydrate source can be nonvolatile. Nonvolatile carbohydrate sources can increase or maximize the ability of the carbohydrate reactant to remain available for reaction with the amine reactant under Maillard reaction conditions. Pre-reacting the mixture of the source of the carbohydrate and the amine reactant can expand the list of suitable carbohydrate sources. The carbohydrate source can be a monosaccharide in its aldose or ketose form, including a triose, a tetrose, a pentose, a hexose, or a heptose; or a polysaccharide, or any combination thereof.

If a triose serves as the carbohydrate source, or is used in combination with other reducing sugars and/or a polysaccharide, an aldotriose sugar or a ketotriose sugar can be utilized, such as glyceraldehyde and dihydroxyacetone, respectively. If a tetrose serves as the carbohydrate source, or is used in combination with other reducing sugars and/or a polysaccharide, aldotetrose sugars, such as erythrose and threose; and ketotetrose sugars, such as erythrulose, can be utilized. If a pentose serves as the carbohydrate source, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, can be utilized. If a hexose serves as the carbohydrate source, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, can be utilized. If a heptose serves as the carbohydrate source, or is used in combination with other reducing sugars and/or a polysaccharide, a ketoheptose sugar such as sedoheptulose can be utilized. Other stereoisomers of such carbohydrate sources not known to occur naturally are also contemplated to be useful in preparing the binder compositions. If a polysaccharide serves as the carbohydrate source, or is used in combination with monosaccharides, then sucrose, lactose, maltose, starch, and cellulose can be utilized.

The carbohydrate reactant can also be used in combination with a non-carbohydrate polyhydroxy reactant. Examples of non-carbohydrate polyhydroxy reactants can include, but are not limited to, trimethylolpropane, glycerol, pentaerythritol, polyvinyl alcohol, partially hydrolyzed polyvinyl acetate, fully hydrolyzed polyvinyl acetate, and mixtures thereof. The non-carbohydrate polyhydroxy reactant can be sufficiently nonvolatile to maximize its ability to remain available for reaction with other binder components during curing. Partially pre-reacting the mixture of the source of the carbohydrate (carbohydrate reactant) and the amine reactant can expand the list of suitable non-carbohydrate polyhydroxy reactants. The hydrophobicity of the non-carbohydrate polyhydroxy reactant can be a factor in determining the physical properties of the binder composition.

The amine reactant capable of participating in a Maillard reaction with the source of the carbohydrate can be a compound possessing at least one amino group. The compound can be present in the form of an amino acid. The free amino group can also come from a protein where the free amino groups are available in the form of, for example, the s-amino group of lysine residues, and/or the α-amino group of the terminal amino acid. The amine reactant can also be formed separately or in situ by using a polycarboxylic acid ammonium salt reactant. Ammonium salts of polycarboxylic acids can be generated by neutralizing the acid groups of a polycarboxylic acid with an amine base, thereby producing polycarboxylic acid ammonium salt groups. Complete neutralization, i.e., about 100% calculated on an equivalents basis, can eliminate any need to titrate or partially neutralize acid groups in the polycarboxylic acid(s). However, it is expected that less-than-complete neutralization would also yield a satisfactory mixture of Maillard reactants.

Suitable polycarboxylic acids can include dicarboxylic acids, tricarboxylic acids, tetracarboxylic acids, pentacarboxylic acids, and the like, monomeric polycarboxylic acids, anhydrides, and any combination thereof, as well as polymeric polycarboxylic acids, anhydrides, and any combination thereof. Preferably, the polycarboxylic acid ammonium salt reactant is sufficiently non-volatile to maximize its ability to remain available for reaction with the carbohydrate reactant of a Maillard reaction. Again, partially pre-reacting the mixture of the source of the carbohydrate and the amine reactant can expand the list of suitable amine reactants, including polycarboxylic acid ammonium salt reactants. In another example, polycarboxylic acid ammonium salt reactants can be substituted with other chemical functional groups.

Illustrative monomeric polycarboxylic acids can include, but are not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Other suitable polycarboxylic acids can include unsaturated aliphatic tricarboxylic acids, saturated aliphatic tricarboxylic acids such as citric acid, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids can be optionally substituted, such as with hydroxy, halo, alkyl, alkoxy, and the like. Other suitable polycarboxylic acids can include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and any combination thereof.

Suitable polymeric polycarboxylic acids can include organic polymers or oligomers containing more than one pendant carboxy group. The polymeric polycarboxylic acid can be a homopolymer or copolymer prepared from unsaturated carboxylic acids that can include, but are not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. The polymeric polycarboxylic acid can also be prepared from unsaturated anhydrides. Unsaturated anhydrides can include, but are not limited to, maleic anhydride, itaconic anhydride, acrylic anhydride, methacrylic anhydride, and the like, as well as mixtures thereof.

Preferred polymeric polycarboxylic acids can include polyacrylic acid, polymethacrylic acid, polymaleic acid, and the like. Examples of commercially available polyacrylic acids include AQUASET-529 (Rohm & Haas, Philadelphia, Pa., USA), CRITERION 2000 (Kemira, Helsinki, Finland, Europe), NF1 (H. B. Fuller, St. Paul, Minn., USA), and SOKALAN (BASF, Ludwigshafen, Germany, Europe). With respect to SOKALAN, this is believed to be a water-soluble polyacrylic copolymer of acrylic acid and maleic acid, having a molecular weight of approximately 4,000. AQUASET-529 is understood to be a composition containing polyacrylic acid cross-linked with glycerol, also containing sodium hypophosphite as a catalyst. CRITERION 2000 is thought to be an acidic solution of a partial salt of polyacrylic acid, having a molecular weight of approximately 2,000. NF1 is believed to be a copolymer containing carboxylic acid functionality and hydroxy functionality, as well as units with neither functionality; NF1 is also thought to contain chain transfer agents, such as sodium hypophosphite or organophosphate catalysts.

The amine reactant for reaction with the polycarboxylic acid can include, but is not limited to, ammonia, a primary amine, i.e., $NH_2R^1$, and a secondary amine, i.e., $NHR^1R^2$, where $R^1$ and $R^2$ are each independently selected from the group consisting of: an alkyl, a cycloalkyl, an alkenyl, a cycloalkenyl, a heterocyclyl, an aryl, and a heteroaryl group. The amine base can be volatile or substantially non-volatile under conditions sufficient to promote reaction among the mixture of Maillard reactants during any partial pre-reaction or during thermal cure of the binder composition. Suitable amine bases can include, but are not limited to, a substantially volatile base, a substantially non-volatile base, or a combination thereof. Illustrative substantially volatile bases can include, but are not limited to, ammonia, ethylamine, diethylamine, dimethylamine, ethylpropylamine, or any combination thereof. Illustrative substantially non-volatile bases can include, but are not limited to, aniline, 1-naphthylamine, 2-naphthylamine, para-aminophenol, or any combination thereof.

One example of the mixture of Maillard reactants includes a mixture of aqueous ammonia, citric acid, and dextrose (glucose). In this mixture, the ratio of the number of molar equivalents of acid salt groups present on the polycarboxylic, citric acid reactant (produced upon neutralization of the —COOH groups of the citric acid by ammonia) to the number of molar equivalents of hydroxyl groups present on the carbohydrate reactant(s) can range from about a low of about 0.04:1, about 0.05:1, about 0.06:1, about 0.07:1, about 0.08:1, about 0.09:1, or about 0.1:1 to a high of about 0.11:1, about 0.12:1, about 0.13:1, about 0.14:1, about 0.15:1, about 0.16:1, about 0.17:1, about 0.18:1, about 0.19:1, or about 0.2:1. Thus, in one embodiment, the number of molar equivalents of hydroxyl groups present on the dextrose, carbohydrate reactant can be about twenty five-fold greater than the number of molar equivalents of acid salt groups present on the polycarboxylic, citric acid reactant. In another embodiment, the number of molar equivalents of hydroxyl groups present on the dextrose carbohydrate reactant is about ten-fold greater than the number of molar equivalents of acid salt groups present on the polycarboxylic citric acid reactant. In yet another embodiment, the number of molar equivalents of hydroxyl groups present on the dextrose carbohydrate reactant is about six-fold greater than the number of molar equivalents of acid salt groups present on the polycarboxylic citric acid reactant.

The mixture of Maillard reactants can have a molar ratio of the source of the carbohydrate (carbohydrate reactant) to the moles of amine functional groups in the amine reactant capable of participating in the Maillard reaction with the carbohydrate reactant from a low of about 0.1:1, about 0.5:1, about 1:1, about 1.5:1, or about 2:1 to a high of about 2.5:1, about 3:1, about 3.5:1, about 4:1, about 4.5:1, or about 5:1. For example the ratio of the moles of the carbohydrate reactant to the moles of the amine functional groups in the amine reactant can be from about 1:1 to about 3:1, about 0.8:1 to about 2.3:1, about 1.7:1 to about 3.3:1, about 2.1:1 to about 3.5:1, about 0.6:1 to about 1.6:1, about 2.4:1 to about 3.4:1, about 1.3:1 to about 2.7:1, or about 1.6:1 to about 2.3:1.

As noted above, the mixture of Maillard reactants can include a source of a carbohydrate and an amine reactant capable of participating in a Maillard reaction therewith. Also, as noted above, the mixture of Maillard reactants can include a partially reacted mixture of a source of a carbohydrate and an amine reactant. For example, the source of a carbohydrate can be mixed with an amine reactant capable of participating in a Maillard reaction with the source of the carbohydrate and the mixture can be heated to about 90° C. for a time sufficient to initiate the Maillard reaction(s), but not allow the reaction(s) to proceed to completion, before finally forming the particles in gel form. Suitable Maillard reactants and Maillard reaction products can be as discussed and described in U.S. Patent Application Publication No. 2009/0301972.

In one or more embodiments, the monomer component of the phenolic compound and the crosslinking compound can be partially or completely replaced with one or more hydrocarbon resins. Illustrative hydrocarbon resins can include, but are not limited to, a polyethylene, a polypropylene, an ethylene vinyl acetate, an ethylene ethyl acrylate, polyurethane, natural polymers, a styrene-isoprene-styrene, an acrylonitrile-butadiene-styrene, a styrene-butadiene-styrene, a polystyrene, a polyurethane, an acrylic polymer, a polyvinyl chloride, a fluoroplastic, a pine rosin (e.g., tall oil rosin, wood rosin, and gum rosin), a modified rosin (e.g., disproportionated rosins, hydrogenated rosins, polymerized or oligomerized rosins, diels-alder rosin adducts), a rosin ester (e.g., hydrogenated rosin esters, polymerized rosin esters, phenolic-modified rosin esters, dibasic acid-modified rosin esters; the rosin esters can be derived from tall oil rosin, wood rosin, and/or gum rosin), a polysulfide, a styrene-acrylonitrile, a nylon, a phenol-formaldehyde novolac resin, or any combination thereof. Other illustrative hydrocarbon resins can include, but are not limited to, oligomers of $C_5$ hydrocarbons (e.g., oligomers of cyclopentadiene), oligomers of $C_9$ hydrocarbons (e.g., oligomers of alpha-methylstyrene and vinyl toluene, often referred to as aromatic hydrocarbon tackifiers), terpene resins (e.g., oligomers of terpenes such as alpha-pinene, beta-pinene, and limonene), oligomeric reaction products of terpenes and phenolics, coumarone-indene resins, oligomeric reaction products of terpenes and styrenics, cycloaliphatic resins (e.g., dicyclopentadiene-based resins), crude tall oil, distilled tall oil, or any combination thereof. The hydrocarbon resin, if present, can be added prior to polymerization, during polymerization, and/or after polymerization been completed.

In another example, the crosslinking compound in the monomer component can be at least partially replaced with one or more carbohydrates. The one or more carbohydrates can include one or more monosaccharides, disaccharides, oligosaccharides, polysaccharides, or any combinations thereof. In one or more embodiments, the one or more carbohydrates can include one or more aldose sugars. In one or more embodiments, the monosaccharide can be or include D-Glucose (dextrose monohydrate), L-Glucose, or a combination thereof. Other carbohydrate aldose sugars can include, but are not limited to, glyceraldehyde, erythrose, threose, ribose, deoxyribose, arabinose, xylose, lyxose, allose, altrose, gulose, mannose, idose, galactose, talose, and any combination thereof. The carbohydrate can also be or include one or more reduced or modified starches such as dextrin, maltodextrin, and oxidized maltodextrins.

In one or more embodiments, the solids content of the monomer component can vary from a low of about 10%, about 15%, about 20%, about 25%, about 35%, about 40%, or about 45% to a high of about 55%, about 60%, about 65%, about 70%, about 75%, about 80%, about 85%, or about 90%. In other embodiments, the solids content of the monomer component can be from about 35% to about 70%, about 40% to about 60%, or about 45% to about 55%. In one or more embodiments, the solids content of the monomer component can be greater than 20%, greater than 25%, greater than 30%, greater than 35%, greater than 40%, or great than 45%, great than 50%, great than 55%, great than 60%, great than 65%, great than 70%, great than 75%, great than 80%, great than 85%, or great than 90%. %. In one or more embodiments, the solids content of the monomer component can be less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, or less than 15%.

The solids content of a composition, as understood by those skilled in the art, can be measured by determining the weight loss upon heating a small sample, e.g., 1-5 grams of the composition, to a suitable temperature, e.g., 125° C., and a time sufficient to remove the liquid. By measuring the weight of the sample before and after heating, the percent solids in the composition can be directly calculated or otherwise estimated.

The catalyst can be or include one or more acids, one ore more bases, or any combination thereof. Illustrative basic catalyst can be or include, but are not limited to, sodium hydroxide, sodium carbonate, sodium bicarbonate, potassium hydroxide, potassium carbonate, potassium bicarbonate, ammonium carbonate, hexamethylenetetramine, or any combination thereof. Illustrative acidic catalysts can include, but are not limited to, acetic acid, hydrochloric acid, sulfuric acid, phosphoric acid, phosphorous acid, sulfonic acid (including but not limited to monosulfonic acid, disulfonic acid, trisulfonic acid, toluene sulfonic acid, and alkane sulfonic acid), gallic acid, oxalic acid, picric acid, or any combination thereof. In at least one example, the catalyst can include a mixture of acetic acid and ammonium acetate and/or ammonium carbonate. In at least one example, the catalyst can be free or substantially free from any metal or metal ions. In other words, the catalyst can be a non-metal or non-metal ion containing catalyst. A catalyst that is substantially free from any metal or metal ions can contain less than 1 wt %, less than 0.5 wt %, less than 0.3 wt %, less than 0.2 wt %, less than 0.1 wt %, less than 0.7 wt %, less than 0.05 wt %, less than 0.3 wt %, less than 0.01 wt %, less than 0.007 wt %, less than 0.005 wt %, less than 0.003 wt %, less than 0.001 wt %, less than 0.0007 wt %, or less than 0.0005 wt %, based on the total weight of the catalyst.

The catalyst can be present in the suspension and/or emulsion in widely varying amounts. For example, the concentration of the catalyst in the suspension and/or emulsion can range from about 1 wt % to about 30 wt %, based on the weight of the phenolic compound. In another example, the concentration of the catalyst in the suspension and/or emulsion, the prepolymer, or the combination thereof can range from about 0.1 wt % to about 10 wt %, based on the total weight of the phenolic compound, the crosslinking compound, catalyst, and liquid medium.

The molar ratio of the phenolic compound(s) to catalyst(s) can range from a low of about 1 to a high of about 2,000. For example, the molar ratio of the phenolic compound(s) to catalyst(s) can range from a low of about 1, about 5, about 10, or about 15 to a high of about 45, about 50, about 60, about 80, about 100, about 125, about 150, about 175, about 200, about 225, about 250, about 275, about 300, about 325, or about 350. In another example, the molar ratio of the phenolic compound(s) to catalyst(s) can range from about 1 to about 1,000, about 100 to about 600, about 10 to about 400, about 5 to about 75, about 200 to about 1,800, about 500 to about 1,500, or about 1 to about 50. In another example, the molar ratio of the phenolic compound(s) to catalyst(s) can range from a low of about 1, about 3, about 5, about 8, about 10, about 12, or about 15 to a high of about 20, about 25, about 20, about 37, about 40, about 43, about 45, or about 49. In another example, the molar ratio of the phenolic compound(s) to catalyst(s) can be less than 200, less than 150, less than 125, less than 100, less than 75, less than 60, less than 50, less than 49, less than 47, less than 45, less than 43, less than 40, less than 37, or less than 35.

In one or more embodiments, the monomer component, i.e., the phenolic compound and/or the crosslinking compound and/or the catalyst can be a liquid mixture in the form of a solution, slurry, suspension, emulsion, or other mixture. For example, the phenolic compound and/or the crosslinking compound can be in the form of an aqueous solution, slurry, suspension, emulsion, or other mixture. Other suitable liquid mediums can include, but are not limited to, one or more alcohols or water/alcohol mixtures. Illustrative alcohols can include, but are not limited to, methanol, ethanol, propanol, isopropanol, butanol, and the like, and mixtures thereof. Other suitable liquid mediums can include, but are not limited to, acetone, tetrahydrofuran, benzene, toluene, xylene, ethylbenzene, cumene, mesitylene, or mixtures thereof.

The concentration of the liquid medium in the monomer component can range from a low of about 5 wt %, about 10 wt %, about 15 wt %, about 20 wt %, about 25 wt %, about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the liquid medium, the phenolic compound, the crosslinking compound, and the catalyst. The concentration of the phenolic compound can range from a low of about 5 wt %, about 10 wt %, about 15 wt %, or about 20 wt % to a high of about 30 wt %, about 35 wt %, about 40 wt %, about 45 wt %, or about 50 wt %, based on the total weight of the liquid medium, the phenolic compound, the crosslinking compound, and the catalyst. The concentration of the crosslinking compound in the monomer component can range from a low of about 3 wt %, about 5 wt %, about 7 wt %, about 10 wt %, about 15 wt %, or about 20 wt % to a high of about 30 wt %, about 45 wt %, about 50 wt %, about 55 wt %, about 60 wt %, or about 70 wt %, based on the total weight of the liquid medium, the phenolic compound, the crosslinking compound, and the catalyst. The concentration of the catalyst in the monomer component can range from a low of about 0.1 wt %, about 0.5 wt %, about 1 wt %, or about 2% to a high of about 10 wt %, about 20 wt %, about 30 wt %, or about 40 wt %, based on the total weight of the liquid medium, the phenolic compound, the crosslinking compound, the prepolymer, and the catalyst.

In one or more embodiments, the molar ratio of the one or more phenolic compounds to the one or more crosslinking compounds can range from a low of about 0.1:1 to a high of about 1:1. For example, the molar ratio of the one or more phenolic compounds to the one or more crosslinking compounds can range from 0.2:1 to about 0.9:1, about 0.3:1 to about 0.8:1, about 0.4:1 to about 0.8:1, about 0.4:1 to about 0.7:1, or about 0.4:1 to about 0.6:1. In at least one example, the molar ratio of the one or more phenolic compounds to the one or more crosslinking compounds can be about 0.5:1. In at least one other example, the reactant mixture can be free or substantially free of any crosslinking compounds. In another example, the molar ratio of the one or more phenolic compounds to the one or more crosslinking compounds can be about 1:1, about 2:1, about 5:1, about 10:1, about 25:1, about 50:1, about 100:1, or about 500:1.

The carrier fluid can be or include one or more hydrocarbons, water, or a combination thereof. Illustrative carrier fluids can include paraffinic oils, naphthenic oils, aromatic oils, or any combination thereof. Illustrative paraffinic hydrocarbons can include mineral oils or any thereof. Suitable mineral oils include one or more alkanes having from about 15 to about 40 carbon atoms. Illustrative naphthenic oils can be hydrocarbons based on cycloalkanes. Illustrative cycloalkanes can include, but are not limited to cyclohexane, cycloheptane, cyclooctane, cyclononane, cyclodecane, or any combination thereof. Another suitable carrier fluid can be or include one or more plant based or plant derived oils. Illustrative plant based or plant derived oils can include, but are not limited to, such as linseed (flaxseed) oil, castor oil, tung oil, soybean oil, cottonseed oil, olive oil, canola oil, corn oil, sunflower seed oil, peanut oil, coconut oil, safflower oil, palm oil, vegetable oil, or any combination thereof. Suitable commercially available vegetable oils can include, but are not limited to, those sold under the tradename WESSON® and sold by CONAGRA FOODS®, such as the vegetable oil, canola oil, corn oil, blended oils, and the like. Another suitable carrier fluid can be or include one or more chlorinated hydrocarbons. Illustrative chlorinated hydrocarbons can include, but are not limited to, carbon tetrachloride, chloroform, methylene chloride, or any combination thereof. Any type of water can be used as the carrier fluid or to make-up at least a portion of the carrier fluid. For example, the water can be distilled water, deionized water, or a combination thereof. In another example, the water can be tap water. Other suitable carrier fluids can be or include cyclohexane, mineral oil, xylene, water, or any mixture thereof.

The use of a carrier fluid that contains or includes water can reduce the cost associated with the production of the polymer particles in gel form as compared to the use of hydrocarbons. The use of a carrier fluid that contains or includes water can also allow for an increased concentration of the monomer component relative to the carrier fluid as compared to a carrier fluid that contains one or more hydrocarbons and is free or substantially free of water, e.g., less than 5 wt % water. In other words, a carrier fluid that is or includes a majority of water, e.g., greater than about 50 wt % water, can allow for a more concentrated suspension and/or emulsion to be formed as compared to when the carrier fluid is or includes a majority of non-water fluid(s), e.g., greater than about 50 wt % hydrocarbons. The use of a carrier fluid that is or includes water may also at least partially remove any residual carrier fluid composed of one or more hydrocarbons. In one or more embodiments, the carrier fluid used to form the reaction mixture can have a water concentration from a low of about 1 wt %, about 3 wt %, about 5 wt %, about 10 wt %, about 15 wt %, about 20 wt %, about 25 wt %, about 30 wt %, about 35 wt %, or about 40 wt % to a high of about 50 wt %, about 55 wt %, about 60 wt %, about 65 wt %, about 70 wt %, about 75 wt %, about 80 wt %, about 85 wt %, about 90 wt %, about 95 wt %, or about 100 wt %. In one or more embodiments, the carrier fluid used to form the reaction mixture can be free from any water.

The carrier fluid can have a boiling point at atmospheric pressure of about 40° C. or more, about 50° C. or more, about 60° C. or more, about 70° C. or more, about 80° C. or more, about 90° C. or more, about 100° C. or more, about 110° C. or more, about 120° C. or more, about 130° C. or more, about 140° C. or more, about 150° C. or more, about 175° C. or more, about 200° C. or more, about 225° C. or more, or about 250° C. or more. The carrier fluid can have a boiling point at the conditions the monomer component undergoes polymerization of about 40° C. or more, about 50° C. or more, about 60° C. or more, about 70° C. or more, about 80° C. or more, about 90° C. or more, about 100° C. or more, about 110° C. or more, about 120° C. or more, about 130° C. or more, about 140° C. or more, about 150° C. or more, about 175° C. or more, about 200° C. or more, about 225° C. or more, or about 250° C. or more. The carrier fluid can have a flash point greater than about −25° C., greater than about −20° C., greater than about −10° C., greater than about 0° C., greater than about 10° C., greater than about 20° C., greater than about 30° C., greater than about 40° C., greater than about 50° C., or greater than about 60° C.

In one or more embodiments, the carrier fluid can be free or essentially free of cycloalkanes, e.g., cyclohexane, cycloheptane, cyclooctane, and the like. As used herein, the phrase "essentially free of cycloalkanes" refers to a carrier fluid that contains less than 3 wt %, less than 2 wt %, less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, less than 0.1 wt %, less than 0.07 wt %, less than 0.05 wt %, less than 0.03 wt %, or less than 0.01 wt % cycloalkanes. In one or more embodiments, the carrier fluid can be free or essentially free, e.g. less than 1 wt %, of cycloalkanes, e.g., cyclohexane. As such, it should also be noted that one other difference between the suspension and/or emulsion polymerization process and the conventional inverse emulsion polymerization process used to produce polymer particles in gel form can be that the use of cyclohexane as the carrier fluid can be avoided. Similarly, another difference between the suspension and/or emulsion polymerization process and the conventional inverse emulsion polymerization process used to produce polymer particles in gel form can be that the use of cycloalkanes as the carrier fluid can be avoided.

In one or more embodiments, the carrier fluid can be or include one or more cycloalkanes, e.g., cyclohexane, cycloheptane, cyclooctane, and the like. For example, the carrier fluid can include one or more cycloalkanes in an amount from a low of about 0.1 wt %, about 1 wt %, about 3 wt %, about 5 wt %, about 10 wt %, about 20 wt %, about 30 wt %, or about 40 wt % to a high of about 50 wt %, about 60 wt %, about 70 wt %, about 80 wt %, about 90 wt %, or about 100 wt %, based on the total weight of the carrier fluid. Said another way, in at least one specific embodiment, the carrier fluid can include any amount of a cycloalkane or any amount of a combination of cycloalkanes. In at least one embodiment, the amount of cyclohexane in the carrier fluid can range from about 1 wt % to about 20 wt %, about 10 wt % to about 30 wt %, about 20 wt % to about 40 wt %, about 30 wt % to about 50 wt %, about 40 wt % to about 60 wt %, about 50 wt % to about 70 wt %, about 60 wt % to about 80 wt %, about 70 wt % to about 90 wt %, or about 80 wt % to about 100 wt %. In one or more embodiments, the carrier fluid can be or include one or more cycloalkanes in an amount of 100 wt %, less than 95 wt %, less than 90 wt %, less than 85 wt %, less than 80 wt %, less than 75 wt %, less than 70 wt %, less than 65 wt %, less than 60 wt %, less than 55 wt %, less than 50 wt %, less than 45 wt %, less than 40 wt %, less than 35 wt %, less than 30 wt %, less than 25 wt %, less than 20 wt %, less than 15 wt %, less than 10 wt %, less than 5 wt %, less than 4 wt %, less than 3 wt %, less than 2 wt %, or less than 1 wt %. In one or more embodiments, the carrier fluid can be or include one or more cycloalkanes in an amount of at least 1 wt %, at least 2 wt %, at least 3 wt %, at least 4 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %.

In one or more embodiments, the carrier fluid can be or include one or more hydrocarbons, e.g., paraffinic hydrocarbons, naphthenic hydrocarbons, aromatic hydrocarbons, plant based or plant derived oils, mineral oils, and/or chlorinated hydrocarbons, having a wide range of carbon atoms. For example, the carrier fluid can be or include one or more hydrocarbons having at least 6, at least 8, at least 10, at least 12, at least 14, at least 16, at least 18, at least 20, at least 22, at least 24, at least 26, at least 28, at least 30, at least 32, at least 34, at least 36, at least 38, at least 40, at least 42, at least 44, at least 46, at least 48, at least 50, at least 52, at least 54, at least 56, at least 58, or at least 60 carbon atoms. For example, the carrier fluid can include one or more hydrocarbons having from a low of about 6, about 8, about 10, about 12, about 14, about 16, about 18, about 20, about 22, about 24, about 26, about 28, or about 30 to a high of about 32, about 34, about 36, about 38, about 40, about 42, about 44, about 46, about 58, about 50, about 60, about 70, about 80, about 90, about 100, about 110, about 120, about 130, about 140, or about 150 carbon atoms.

In one or more embodiments, the carrier fluid can be or include a hydrocarbon having at least 8 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 10 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 12 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 14 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 16 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 18 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 20 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 22 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 24 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 26 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 28 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 30 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 32 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 34 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 36 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 38 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 40 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, suitable hydrocarbons having at least 8, 10, 12, 14, 16, 18, 20, 22, 24, 26, 28, 30, 32, 34, 36, 38, or 40 carbon atoms can have up to about 40, about 50, about 60, about 70, about 80, about 100, about 110, about 120, about 130, about 140, or about 150 carbon atoms.

If any one or more of the components discussed and described herein include two or more different compounds, those two or more different compounds can be present in any ratio with respect to one another. For example, if the phenolic compound includes a first phenolic compound and a second phenolic compound, the phenolic compounds can have a concentration of the first phenolic compound ranging from about 1 wt % to about 99 wt % and conversely about 99 wt % to about 1 wt % of the second phenolic compound, based on the total weight of the first and second phenolic compound. In another example, the amount of the first phenolic compound can range from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the first and second phenolic compounds. When the crosslinking compound, catalyst, and/or liquid medium includes two or more different compounds, those two or more different compounds can be present in similar amounts as the first and second phenolic compound.

The suspension and/or emulsion polymerization of the monomer component can be carried out in the presence of one or more filler materials. In other words, the suspension and/or emulsion can include one or more filler materials. The filler material can be combined with the monomer component, the prepolymer, the carrier fluid, or any combination thereof. The filler material can be or include solid particles, hollow particles, porous particles, or any combination thereof. Illustrative filler materials can include, but are not limited to, naturally occurring organic filler material such as pecan shells, inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or any combination thereof. Material suitable for use as a filler material can include those discussed and described in U.S. Patent Application Publication Nos. 2006/0078682 and 2008/0277115. The filler material can be coated with the polymer in gel form to produce polymer particles in gel form having a core of the filler material and an outer layer of the gel disposed thereon. The particles in gel form can include a single filler component or filler particle or a plurality of filler components or filler particles. For example, the particles in gel form can include anywhere form about 1 discrete filler component to about 10, about 20, about 30, about 40, about 50, about 60, about 70, about 80, about 90, about 100, about 150, about 200, about 250, about 500, about 1,000, about 1,500, about 2,000, about 10,000, about 20,000 or more discrete filler components. The size of the filler component can, at least in part, dictate the number of particular filler component particles within any given polymer particle in gel form.

The suspension and/or emulsion polymerization of the monomer component can also be carried out in the presence of one or more tetra alkyl orthosilicates other orthosilicates to increase the yield, the crosslink density, and/or strength of the polymer particle in gel form. Illustrative tetra alkyl orthosilicates can include, but are not limited to, tetraethyl orthosilicate, tetramethyl orthosilicate (TMOS), or a combination thereof.

Metal ions can also be intentionally doped or added to the reactant mixture, the monomer component, the carrier fluid, the polymer particles in gel form, dried polymer particles produced by removing at least a portion of any of the liquid from the particles in gel form, the suspension and/or emulsion, or any combination thereof. For example, metal doped hydrocarbons such as metal doped furfural can be combined with the monomer component and/or the suspension and/or emulsion to add metals to the polymer particles in gel form and/or increase carbon yield.

The polymer particles in gel form can also include one or more electrochemical modifiers or dopant. The electrochemical modifier can be selected to optimize the electrochemical performance of the carbon materials. The electrochemical modifier can be added before, during, and/or after the polymerization step, described above, is started. For example, the electrochemical modifier can be added to the above described mixture, monomer component, carrier fluid, catalyst, prepolymer, or included within the polymerization process in any other manner.

The electrochemical modifier can be any chemical element, compound comprising a chemical element or any combination of different chemical elements and compounds which modifies (e.g., enhances or decreases) the electrochemical performance of a carbon material. Electrochemical modifiers can change (increase or decrease) the resistance, capacity, power performance, stability and other properties of a carbon material. Electrochemical modifiers generally impart a desired electrochemical effect. In contrast, an impurity in a carbon material is generally undesired and tends to degrade, rather than enhance, the electrochemical performance of the carbon material. Examples of electrochemical modifiers within the context of the present disclosure can include, but are not limited to, elements, and compounds or oxides comprising elements, in groups 12-15 of the periodic table, other elements such as sulfur, tungsten and silver and combinations or mixtures thereof. For example, electrochemical modifiers can include, but are not limited to, lead, tin, antimony, bismuth, arsenic, tungsten, silver, zinc, cadmium, indium, silicon, combinations thereof, or mixtures thereof, as well as oxides of the same and compounds comprising the same.

In certain embodiments the electrochemical modifier comprises an element with the ability to lithiate from 3 to 0 V versus lithium metal (e.g., silicon, tin, sulfur). In other embodiments, the electrochemical modifier comprises metal oxides with the ability to lithiate from 3 to 0 V versus lithium metal (e.g., iron oxide, molybdenum oxide, titanium oxide). In still other embodiments, the electrochemical modifier comprises elements which do not lithiate from 3 to 0 V versus lithium metal (e.g., aluminum, manganese, nickel, metal-phosphates). In yet other embodiments, the electrochemical modifier comprises a non-metal element (e.g., fluorine, nitrogen, hydrogen). In still other embodiments, the electrochemical modifier comprises any of the foregoing electrochemical modifiers or any combination thereof (e.g., tin-silicon, nickel-titanium oxide).

The electrochemical modifier may be provided in any number of forms. For example, in some embodiments the electrochemical modifier comprises a salt. In other embodiments, the electrochemical modifier comprises one or more elements in elemental form, for example elemental iron, tin, silicon, nickel or manganese. In other embodiments, the electrochemical modifier comprises one or more elements in oxidized form, for example iron oxides, tin oxides, silicon oxides, nickel oxides, aluminum oxides or manganese oxides.

In other embodiments, the electrochemical modifier comprises iron. In other embodiments, the electrochemical modifier comprises tin. In other embodiments, the electrochemical modifier comprises silicon. In some other embodiments, the electrochemical modifier comprises nickel. In yet other embodiments, the electrochemical modifier comprises aluminum. In yet other embodiments, the electrochemical modifier comprises manganese. In yet other embodiments, the electrochemical modifier comprises $Al_2O_3$. In certain embodiments, the electrochemical modifier can be selected from iron, tin, silicon, nickel, aluminum and manganese, or any combination or mixture thereof. In some embodiments, the electrochemical modifier is silicon and in other embodiments the electrochemical modifier is nitrogen.

Nitrogen can also be intentionally doped or added to the reactant mixture, the monomer component, the carrier fluid, the polymer particles in gel form, dried polymer particles produced by removing at least a portion of any of the liquid from the particles in gel form, the suspension and/or emulsion, or any combination thereof. For example, nitrogen-rich compounds can be combined with the monomer component and/or the suspension and/or emulsion to add nitrogen to the polymer particles in gel form. Adding or increasing the concentration of nitrogen in the polymer particles in gel form and/or dried form can improve the capacitance of one or more end products, e.g., carbonized particles. Illustrative nitrogen sources can include, but are not limited to, urea, melamine, nitric acid, or any combination thereof.

As an alternative to the suspension and/or emulsion polymerization methods discussed and described herein one or more alternative polymerizations processes can be used to produce the polymer particles in gel form and/or in a non-gel form. For example, one alternative processes, can include, but is not limited to, gas phase polymerization in which the monomer component is initially in the gaseous phase and the polymer particles form within the fluidized or gaseous medium.

It should be noted that suspension and/or emulsion polymerization process used to produce the polymer particles in gel form can be conducted or carried out without the use of or in the substantial absence of any surfactant. Illustrative surfactants that can be absent from the suspension and/or emulsion or dispersion polymerization process include, but are not limited to, SPAN™ 80, SPAN™ 85, SPAN™ 65, SPAN™ 60, SPAN™ 40, SPAN™ 20, TWEEN® 80, TWEEN® 40, TWEEN® 20, TWEEN® 21, TWEEN® 60, TRITON-X® 100, Lecithin P123, CTAB, and the like. In another example, the surfactant can be or include a non-ionic surfactant having a molecular weight of from about 100 Daltons to about 2,000 Daltons. In one or more embodiments, suitable non-ionic surfactants can have a molecular weight from a low of about 100, about 200, about 300, about 400, about 500, about 600, about 700, about 800, or about 900 to a high of about 1,100, about 1,300, about 1,500, about 1,700, about 1,900, about 2,100, about 2,300, about 2,500, about 2,700, about 3,000, about 3,300, about 3,500, about 3,700, or about 4,000 Daltons.

The carrier fluid can be free or substantially free from any surfactant. The suspension and/or emulsion that includes the reactant mixture can also be free or substantially free from any surfactant. As used herein, the term "essentially free of any surfactant," when used with reference to the carrier fluid, refers to a carrier fluid that contains less than 1 wt %, less than 0.5 wt %, less than 0.3 wt %, less than 0.2 wt %, less than 0.1 wt %, less than 0.7 wt %, less than 0.05 wt %, less than 0.3 wt %, less than 0.01 wt %, less than 0.007 wt %, less than 0.005 wt %, less than 0.003 wt %, less than 0.001 wt %, less than 0.0007 wt %, or less than 0.0005 wt %, based on the total weight of the carrier fluid. As used herein, the term "essentially free of any surfactant," when used with reference to the suspension and/or an emulsion, refers to a suspension and/or emulsion that contains less than 1 wt %, less than 0.5 wt %, less than 0.3 wt %, less than 0.2 wt %, less than 0.1 wt %, less than 0.7 wt %, less than 0.05 wt %, less than 0.3 wt %, less than 0.01 wt %, less than 0.007 wt %, less than 0.005 wt %, less than 0.003 wt %, less than 0.001 wt %, less than 0.0007 wt %, or less than 0.0005 wt %, based on the total weight of the suspension and/or emulsion.

In one or more embodiments, a surfactant can be present in the reaction mixture. While not wishing to be bound by theory, it is believed that the amount of surfactant present in the mixture may be a parameter that can be modified to control the physical properties of the resulting gel and/or carbon materials. For example, surfactant concentrations less than or equal to about 2% may be associated with mesoporous carbons, while higher surfactant concentrations may be associated with microporous carbons. However, high concentrations of surfactant (e.g., greater than about 30%) do not appear to be as effective. While surfactant may be desirable in some embodiments, it is not required in all embodiments of the disclosed methods.

In some embodiments when a surfactant is present, the emulsion, suspension, or combination thereof can include from a low of about 0.01%, about 0.05%, about 0.1%, about 0.5%, about 1%, about 1.5%, about 2%, about 3%, or about 5% to a high of about 7%, about 10%, about 12%, about 14%, about 16%, about 18%, about 20%, about 22%, about 24%, or about 26% surfactant (w/w). For example, the emulsion, suspension, or combination thereof can include from about 0.2% to about 20%, about 0.6% to about 15%, about 4% to about 13%, about 7% to about 14%, about 9% to about 11%, or about 8% to about 14% surfactant (w/w). In other embodiments, the emulsion, suspension, or combination thereof can include from about 0.1% to about 10% surfactant (w/w), for example about 5% surfactant (w/w). In other embodiments, the emulsion, suspension, or combination thereof can include from about 0.1% to about 2% surfactant (w/w), for example about 0.5% or about 1% surfactant (w/w). In other embodiments, the emulsion, suspension, or combination thereof can include from about 0.01% to about 1.0% surfactant (w/w), for example about 0.1% to about 1.0% surfactant (w/w). In other embodiments, the emulsion, suspension, or combination thereof can include from about 1.0% to about 2.0% surfactant (w/w). In other embodiments, the emulsion, suspension, or combination thereof can include from about 2.0% to about 5.0% surfactant (w/w). In other embodiments, the emulsion, suspension, or combination thereof can include from about 5.0% to about 10% surfactant (w/w). In some certain embodiments, the emulsion, suspension, or combination thereof can include about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9% or about 2.0% surfactant (w/w). In other embodiments, the emulsion, suspension or combination thereof comprise from about 9.0% to about 11.0%, from about 0.05% to about 1.1% surfactant or from about 0.9% to about 1.1% surfactant (w/w).

In some embodiments, the surfactant level can be at a concentration above the critical micelle concentration or "CMC." As used herein, the critical micelle concentration or CMC is defined as the concentration above which a surfactant (s) forms micelles, and all additional surfactant(s) added to the system go to micelles. In other embodiments, the surfactant level can be at a concentration below the CMC. For example, the surfactant level can be present at a concentration less than 100%, less than 95%, less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10%, less than 5%, less than 3%, less than 2%, less than 1%, less than 0.5%, less than 0.3%, less than 0.1%, less than 0.05%, or less than 0.01% of the CMC. As discussed above, in at least one specific embodiment, the emulsion, suspension, or combination thereof can be free from any surfactant.

In one or more embodiments, one or more surfactants can be added to the suspension and/or emulsion if so desired. For example, non-ionic surfactants such as nonylphenol ethoxylates and/or tall oil fatty acid glycerol esters ("TOFA-glycerol esters") can be used. Suitable commercially available surfactants can include, but are not limited to, Span 80, Triton X-100, Lecithin P123, CTAB, and the like. The amount of the surfactant can range from a low of about 0.3 wt %, about 0.5 wt %, about 0.7 wt %, about 1 wt %, or about 1.5 wt % to a high of about 2 wt %, about 3 wt %, about 5 wt %, about 10 wt %, or about 15 wt %, for example.

It should also be noted that the monomer component, the prepolymer, or the combination thereof can further include one or more other additives. Illustrative additives can include, but are not limited to, sulfur, carbon black, antioxidants, zinc oxide, accelerators, cellulose, filler, rheology modifiers, thickeners, wetting agents, colorants, lubricants, leveling agents, UV stabilizers, plasticizers, silica, processing oils, softening oils, bloating agents, or any combination thereof.

The polymer particles in gel form can have an average cross-sectional length of about 0.1 mm or more, about 0.5 mm or more, about 1 mm or more, about 1.5 mm or more, about 2 mm or more, about 2.5 mm or more, about 3 mm or more, about 3.5 mm or more, about 4 mm or more, about 4.5 mm or more, about 5 mm or more, about 5.5 mm or more, or about 6 mm or more. The polymer particles in gel form can have an average cross-sectional length of from a low of about 0.1 mm, about 0.5 mm, about 1 mm, about 1.5 mm, about 2 mm, about 2.5 mm, about 3 mm, about 3.5 mm, or about 4 mm to a high of about 5 mm, about 7 mm, about 10 mm, about 12 mm, about 15 mm, about 18 mm, about 20 mm, about 25 mm, or about 30 mm. In one or more embodiments, the polymer particles in gel form can have an average cross-sectional length from a low of about 1 µm, about 10 µm, about 50 µm, about 100 µm, about 200 µm, about 300 µm, about 500 µm, about 700 µm, or about 1,000 µm to a high of about 1.1 mm, about 1.3 mm, about 1.5 mm, about 2 mm, about 3 mm, about 4 mm, about 5 mm, about 7 mm, or about 10 mm.

The polymer particles in gel form can have a particle size distribution, i.e., the average cross-sectional length for any two polymer particles in gel form can vary. For example, about 10%, about 20%, about 30%, about 40%, about 50%, about 60%, about 70%, about 80%, about 90%, about 95%, or about 100% of the polymer particles in gel form can have an average cross-sectional length greater than or equal to 1 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.1 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.2. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.3 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.5 mm. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 1.7. In another example, about 10%, about 20%, about 30%, about 40%, about 50%, about 60%, about 70%, about 80%, about 90%, about 95%, or about 100% of the polymer particles in gel form can have an average cross-sectional length greater than or equal to 2 mm. In still another example, about 10%, about 20%, about 30%, about 40%, about 50%, about 60%, about 70%, about 80%, about 90%, about 95%, or about 100% of the polymer particles in gel form can have an average cross-sectional length greater than or equal to about 1 mm, about 1.2 mm, about 1.4 mm, about 1.6 mm, about 1.8 mm, about 2.1 mm, about 2.3 mm, or about 2.5 mm. In yet another example, about 10%, about 20%, about 30%, about 40%, about 50%, about 60%, about 70%, about 80%, about 90%, about 95%, or about 100% of the polymer particles in gel form have an average cross-sectional length greater than or equal to about 1 mm, about 1.5 mm, about 2 mm, about 2.5 mm, about 3 mm, about 3.5 mm, about 4 mm, about 4.5 mm, about 5 mm, or about 5.5 mm. In yet another example, about 10%, about 20%, about 30%, about 40%, about 50%, about 60%, about 70%, about 80%, about 90%, about 95%, or about 100% of the polymer particles in gel form can have an average cross-sectional length greater than or equal to about 1 mm, about 1.5 mm, about 2 mm, about 2.5 mm, about 3 mm, about 3.5 mm, or about 4 mm and an average cross-sectional length less than 30 mm, about 25 mm, about 20 mm, about 18 mm, about 15 mm, about 12 mm, about 10 mm, about 7 mm, or about 5 mm.

In one or more embodiments, the particle size distribution of the polymer particles in gel form can have a polydispersity index $(D_{v,90}-D_{v,10})/D_{v,50}$, where $D_{v,10}$, $D_{v,50}$ and $D_{v,90}$ are the volume average particle sizes at 10%, 50% and 90%, respectively, of the particle size distribution by volume) of less than 1,000. For example, the polymer particles in gel form can have a polydispersity index of less than 1000, less than 700, less than 500, less than 300, less than 100, less than 50, less than 25, less than 10, less than 5, less than 3, less than 2, less than 1.5, or less than 1. The volume average particle size can be measured either by visual counting and measurement of individual particles or by laser light scattering of particles in a suspension fluid.

In one or more embodiments, the preparation of the polymer particle sin gel form can be controlled, e.g., introduction of an aqueous phase to an organic phase can be staged, such that two or more populations of polymer particle size distribution can be produced. As such, the final polymer particle distribution can include one or two or more nodes, where the ratio between the highest and lowest node is about 1000 or lower, about 500 or lower, about 200 or lower, about 100 or lower, about 50 or lower, about 25 or lower, about 10 or lower, 5 or lower, or about 2 or lower.

The polymer particles in gel form can have a surface area ranging from a low of about 50 $m^2/g$, about 100 $m^2/g$, about 200 $m^2/g$, about 400 $m^2/g$, or about 500 $m^2/g$ to a high of about 800 $m^2/g$, about 1,100 $m^2/g$, about 1,400 $m^2/g$, about 1,700 $m^2/g$, or about 2,000 $m^2/g$. For example, the surface area of the polymer particles in gel form can be from about 75 $m^2/g$ to about 700 $m^2/g$, about 350 $m^2/g$ to about 1,000 $m^2/g$, about 850 $m^2/g$ to about 1,750 $m^2/g$, or about 600 $m^2/g$ to about 1,300 $m^2/g$.

The polymer particles in gel form can have a pore size ranging from a low of about 0.2 nm, about 0.5 nm, about 1 nm, about 5 nm, or about 10 nm to a high of about 100 nm, about 200 nm, about 300 nm, about 400 nm, or about 500 nm. For example, the pore size of the polymer particles in gel form can be from about 3 nm to about 75 nm, about 15 nm to about 150 nm, about 40 nm to about 450 nm, or about 20 nm to about 300 nm.

The pore size of the polymer particles in gel form can also be referred to as being microporous (less than or equal to 2 nm), mesoporous (from 2 nm to about 50 nm), or macroporous (greater than 50 nm). The polymer particles can have only a microporous pore size distribution, only a mesoporous pore size distribution, or only a macroporous pore size distribution. In another example, the polymer particles can have a combination of microporous pore size, mesoporous pore size, and/or macroporous pore size distribution.

The polymer particles in gel form can have a monomodal pore size distribution, a bimodal pore size distribution, or a multi-modal pore size distribution. In another example, the polymer particles can have only a monomodal pore size distribution, a bimodal pore size distribution, or a multi-modal pore size distribution.

The polymer particles in gel form can have a pore volume ranging from a low of about 0.05 $cm^3/g$, about 0.1 $cm^3/g$, about 0.5 $cm^3/g$, about 1 $cm^3/g$, or about 1.5 $cm^3/g$ to a high of about 2 $cm^3/g$, about 2.5 $cm^3/g$, about 3 $cm^3/g$, about 3.5 $cm^3/g$, or about 4 $cm^3/g$. For example, the surface area of the polymer particles in gel form can be from about 0.05 $cm^3/g$ to about 1 $cm^3/g$, about 0.7 $cm^3/g$ to about 3.5 $cm^3/g$, about 0.5 $cm^3/g$ to about 3 $cm^3/g$, or about 2.5 $cm^3/g$ to about 4 $cm^3/g$.

The polymer particles in gel form can be further processed to produce aerogel, xerogel, and/or cryogel particles. The particular end product can depend, at least in part, on the particular process used to remove the liquid medium and/or carrier fluid from the polymer particles in gel form. For example, a process for converting the polymer particles in gel form to an aerogel can include supercritical extraction of the liquid medium and/or the carrier fluid. In another example, a process for converting the polymer particles in gel form to a xerogel can include air drying to remove the liquid medium and/or the carrier fluid. In another example, a process for converting the polymer particles in gel form to a cryogel can include freeze drying to remove the liquid medium and/or the carrier fluid.

The polymer particles in gel form can be separated from the carrier fluid to provide separated polymer particles in gel form. The polymer particles and the carrier fluid can be separated from one another using any suitable system, device, or combination of systems and/or devices. For example, the polymer particles in gel form can be separated from the carrier fluid using a solid bowl centrifuge, a decanter bowl centrifuge, a high speed disc bowl centrifuge, a decanter centrifuge, a cyclone, gravity or sedimentation, flotation, filtration, and the like, and combinations thereof.

The separated carrier fluid can be reused. For example, the separated carrier fluid can be recycled to the same or other mixer, reactor, or other vessel and to provide at least a portion of the carrier fluid therein. The separated carrier fluid can be subjected to a cleaning process, e.g., filtration, heating, screening, centrifugation, or the like, to remove at least a portion of any contaminants therein prior to reuse.

In one or more embodiments, the liquid and/or carrier fluid contained in and/or on the polymer particles in gel form can be replaced with a more volatile solvent via solvent exchange. For example, the polymer particles in gel form can be contacted with a hydrocarbon solvent, e.g., acetone, which can remove at least a portion of the liquid medium and/or the carrier fluid and with the hydrocarbon solvent. The hydrocarbon solvent can then be more readily removed from the polymer particles in gel form to provide substantially dry polymer particles via supercritical extraction, air drying, freeze drying, and the like. However, the polymer particles in gel form that contain the liquid and/or carrier fluid can also be dried via supercritical, air, or freeze drying.

In one or more embodiments, the polymer gel particles in gel form can be freeze dried prior to pyrolyzing and/or activating, however such drying is not required and the polymer gel can be pyrolyzed and/or activated without drying. For example, the polymer particles in gel form can be frozen via immersion in a medium having a temperature of less than $-10°$ C., less than $-15°$ C., less than $-20°$ C., less than $-30°$ C., less than $-40°$ C., or less than $-50°$ C. For example, the medium can be liquid nitrogen or ethanol (or other organic solvent) in dry ice or ethanol cooled by another means. In some embodiments, freeze drying can include subjecting the frozen particles to a vacuum pressure of below about 1,000 mTorr, below about 1,500 mTorr, below about 2,500 mTorr, below about 3,000 mTorr, or below about 3,500 mTorr. In another embodiment, drying under vacuum can include subjecting the frozen particles to a vacuum pressure of less than 1000 mTorr, less than 900 mTorr, less than 800 mTorr, less than 700 mTorr, less than 600 mTorr, less than 500 mTorr, less than 400 mTorr, less than 300 mTorr, or less than 200 mTorr. Alternatively, drying under vacuum comprises subjecting the frozen particles to a vacuum pressure of less than about 100 mTorr, less than 90 mTorr, less than 80 mTorr, less than 70 mTorr, or less than 50 mTorr.

Other methods of rapidly freezing the polymer gel particles are also envisioned. For example, in another embodiment the polymer gel is rapidly frozen by co-mingling or physical mixing of polymer gel particles with a suitable cold solid, for example, dry ice (solid carbon dioxide). Another envisioned method comprises using a blast freezer with a metal plate at $-60°$ C. to rapidly remove heat from the polymer gel particles scattered over its surface. Another method of rapidly cooling water in a polymer gel particle is to snap freeze the particle by pulling a high vacuum very rapidly (the degree of vacuum is such that the temperature corresponding to the equilibrium vapor pressure allows for freezing). Yet another method for rapid freezing comprises admixing a polymer gel with a suitably cold gas. In some embodiments the cold gas may have a temperature below about −10° C. In some embodiments the cold gas may have a temperature below about −20° C. In some embodiments the cold gas may have a temperature below about −30° C. In yet other embodiments, the gas may have a temperature of about −196° C. For example, in some embodiments, the gas is nitrogen. In yet other embodiments, the gas may have a temperature of about −78° C. For example, in some embodiments, the gas is carbon dioxide.

In other embodiments, the polymer gel particles are frozen on a lyophilizer shelf at a temperature of −20° C. or lower. For example, in some embodiments the polymer gel particles are frozen on the lyophilizer shelf at a temperature of −30° C. or lower. In some other embodiments, the polymer gel monolith is subjected to a freeze thaw cycle (from room temperature to −20° C. or lower and back to room temperature), physical disruption of the freeze-thawed gel to create particles, and then further lyophilization processing. For example, in some embodiments, the polymer gel monolith is subjected to a freeze thaw cycle (from room temperature to −30° C. or lower and back to room temperature), physical disruption of the freeze-thawed gel to create particles, and then further lyophilization processing.

Suitable processes for removing at least a portion of the liquid and/or carrier fluid from within and/or on the polymer particles in gel form can be as discussed and described in U.S. Patent Application Publication No. 2011/0028599.

After removal of at least a portion of the solvent, the polymer particles or "dried polymer particles" can be subjected to a carbonization or pyrolysis process to remove at least a portion of the non-carbon components, i.e., hydrogen, oxygen, nitrogen, and other non-carbon atoms, from the dried polymer particles. The resulting carbonized or pyrolyzed particles contain primarily carbon. Any pyrolyzation or carbonization process can be used. In one example, the dried polymer aerogel, xerogel, and/or cryogel particles can be placed into a rotary kiln and heated therein. The pyrolysis process can be carried out under an inert atmospheres, e.g., a nitrogen, argon, or other inert gas or gas mixture. Pyrolysis processes are well known to those of skill in the art.

The duration of the pyrolysis, i.e., the period of time during which the polymer particles are maintained at the elevated temperature can range from about 30 seconds to about 10 hours, about 1 minute to about 5 hours, about 5 minutes to about 2 hours, about 10 minutes to about 1 hour, or about 20 minutes to about 45 minutes. The polymer particles in gel form can by pyrolyzed by heating the polymer particles in gel form to a temperature of from a low of about 500° C., about 600° C., about 700° C., about 800° C., about 900° C., or about 1,000° C. to a high of about 1,500° C., about 1,700° C., about 1,900° C., about 2,100° C., about 2,300° C. or about 2,400° C. For example, the pyrolysis dwell temperature can range from about 500° C. to about 2,400° C., about 600° C. to about 1,800° C., about 600° C. to about 1,200° C., or about 650° C. to about 1,100° C.

The pyrolyzed particulates can be activated. Activating the pyrolyzed particulates can include any activation process or combination of activation processes known to those skilled in the art. The activation time and/or activation temperature can affect the performance of the resulting activated carbon material, as well as the manufacturing cost thereof. For example, increasing the activation temperature and the activation dwell time can yield higher activation percentage of the particulates, but can also correspond to the removal of more material compared to lower temperatures and shorter dwell times. As such, higher activation can increase performance of the final activated carbon, but it can also increase the cost of the process by reducing the overall carbonized product.

Pyrolyzed polymer aerogels, xerogels, and/or crygogels can be activated by contacting the pyrolyzed polymer gel with an activating agent. Illustrative activating agents can be or include gases such as carbon dioxide, steam, oxygen, or any combination thereof. Other activating agents can include other compounds or chemicals.

The activation process can range from about 1 minute to about 2 days, about 5 minutes to about 1 day, about 1 minute to about 18 hours, about 1 minute to about 12 hours, about 5 minutes to about 8 hours, about 1 minute to about 10 minutes, or about 1 hour to about 5 hours.

In one example of an activation process, the pyrolyzed aerogel, xerogel, and/or cryogel particles can be weighed and placed in a rotary kiln and an automated gas control manifold and controller can be set to ramp rate of about 20° C. per minute. Carbon dioxide can be introduced to the kiln environment for a period of time once the proper activation temperature has been reached. After activation has occurred, the carbon dioxide can be replaced by nitrogen and the kiln can be cooled down. The recovered activated particles can be weighed at the end of the process to assess the level of activation. Other activation processes are well known to those of skill in the art. The activation temperature can range from a low of about 700° C., about 800° C., about 850° C., or about 900° C. to a high of about 1,100° C., about 1,200° C., about 1,300° C., or about 1,500° C. For example, the activation temperature can range from about 800° C. to about 1,300° C., about 900° C. to about 1,050° C., or about 900° C. to about 1,000° C. One skilled in the art will recognize that other activation temperatures, either lower or higher, may be employed.

The degree of activation can be measured in terms of the mass percent of the pyrolyzed cryogel that is lost during the activation step. The degree of activation can range anywhere from a low of about 1%, about 5%, about 10%, about 20%, about 30%, about 40%, or about 50% to a high of about 60%, about 70%, about 80%, about 90%, about 95%, or about 99%.

The polymer particles after drying, after pyrolyzing, and/or after activation can have an average cross-sectional length of about 0.1 mm or more, about 0.5 mm or more, about 1 mm or more, about 1.5 mm or more, about 2 mm or more, about 2.5 mm or more, about 3 mm or more, about 3.5 mm or more, about 4 mm or more, about 4.5 mm or more, about 5 mm or more, about 5.5 mm or more, or about 6 mm or more. The polymer particles after drying, after pyrolyzing, and/or after activation can have an average cross-sectional length of from a low of about 0.1 mm, about 0.5 mm, about 1 mm, about 1.5 mm, about 2 mm, about 2.5 mm, about 3 mm, about 3.5 mm, or about 4 mm to a high of about 5 mm, about 7 mm, about 10 mm, about 12 mm, about 15 mm, about 18 mm, about 20 mm, about 25 mm, or about 30 mm. In one or more embodiments, the polymer particles polymer particles after drying, after pyrolyzing, and/or after activation can have an average cross-sectional length from a low of about 1 µm, about 10 µm, about 50 µm, about 100 µm, about 200 µm, about 300 µm, about 500 µm, about 700 µm, or about 1,000 µm to a high of about 1.1 mm, about 1.3 mm, about 1.5 mm, about 2 mm, about 3 mm, about 4 mm, about 5 mm, about 7 mm, or about 10 mm.

The polymer particles after drying, after pyrolyzing, and/or after activation can have a particle size distribution, i.e., the average cross-sectional length for any two polymer particles form can vary. For example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1 mm. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.1 mm. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.2. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.3 mm. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.5 mm. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 1.7. In another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to 2 mm. In still another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to about 1 mm, about 1.2 mm, about 1.4 mm, about 1.6 mm, about 1.8 mm, about 2.1 mm, about 2.3 mm, or about 2.5 mm. In yet another example, about 10%, about 20%, about 30%, about 40%, about 50%, about 60%, about 70%, about 80%, about 90%, about 95%, or about 100% of the polymer particles after drying, after pyrolyzing, and/or after activation can have an average cross-sectional length greater than or equal to about 1 mm, about 1.5 mm, about 2 mm, about 2.5 mm, about 3 mm, about 3.5 mm, about 4 mm, about 4.5 mm, about 5 mm, or about 5.5 mm.

The polymer particles after drying, after pyrolyzing, and/or after activation can have a surface area ranging from a low of about 100 m²/g, about 400 m²/g, about 800 m²/g, about 1,000 m²/g, or about 1,200 m²/g to a high of about 2,000 m²/g, about 2,500 m²/g, about 3,000 m²/g, about 3,500 m²/g, or about 4,000 m²/g. For example, the polymer particles after drying, after pyrolyzing, and/or after activation form can be from about 100 m²/g to about 500 m²/g, about 300 m²/g to about 1,400 m²/g, about 700 m²/g to about 2,800 m²/g, or about 1,600 m²/g to about 3,800 m²/g. The surface area of the polymer particles in gel form, after drying, after pyrolyzing, and/or after activation can refer to the total specific surface area of a substance measurable by the Brunauer/Emmett/Teller or "BET" technique. The BET technique employs an inert gas, for example nitrogen, to measure the amount of gas adsorbed on a material and is commonly used in the art to determine the accessible surface area of materials.

The polymer particles after drying, after pyrolyzing, and/or after activation can have a pore size ranging from a low of about 0.2 nm, about 0.5 nm, about 1 nm, about 5 nm, or about 10 nm to a high of about 100 nm, about 200 nm, about 300 nm, about 400 nm, or about 500 nm For example, the polymer particles after drying, after pyrolyzing, and/or after activation can be from about 3 nm to about 75 nm, about 15 nm to about 150 nm, about 40 nm to about 450 nm, or about 20 nm to about 300 nm.

The pore size of the polymer particles after drying, after pyrolyzing, and/or after activation can also be referred to as being microporous (less than or equal to 2 nm), mesoporous (from 2 nm to about 50 nm), or macroporous (greater than 50 nm). The polymer particles after drying, after pyrolyzing, and/or after activation can have only a microporous pore size distribution, only a mesoporous pore size distribution, or only a macroporous pore size distribution. In another example, the polymer particles after drying, after pyrolyzing, and/or after activation can have a combination of microporous pore size, mesoporous pore size, and/or macroporous pore size distribution.

The polymer particles after drying, after pyrolyzing, and/or after activation can have a monomodal pore size distribution, a bimodal pore size distribution, or a multi-modal pore size distribution. In another example, the polymer particles after drying, after pyrolyzing, and/or after activation can have only a monomodal pore size distribution, a bimodal pore size distribution, or a multi-modal pore size distribution.

The polymer particles after drying, after pyrolyzing, and/or after activation can have a pore volume ranging from a low of about 0.05 cm³/g, about 0.1 cm³/g, about 0.5 cm³/g, about 1 cm³/g, or about 1.5 cm³/g to a high of about 2 cm³/g, about 2.5 cm³/g, about 3 cm³/g, about 3.5 cm³/g, or about 4 cm³/g. For example, the pore volume of the polymer particles after drying, after pyrolyzing, and/or after activation can be from about 0.05 cm³/g to about 1 cm³/g, about 0.7 cm³/g to about 3.5 cm³/g, about 0.5 cm³/g to about 3 cm³/g, or about 2.5 cm³/g to about 4 cm³/g.

The polymer particles after drying, after pyrolyzing, and/or after activation can have a real density ranging from a low of about 0.05 g/cm³, about 0.1 g/cm³, about 0.2 g/cm³, about 0.4 g/cm³, or about 0.6 g/cm³ to a high of about 0.9 g/cm³, about 1 g/cm³, about 1.2 g/cm³, about 1.3 g/cm³, about 1.6 g/cm³, or about 1.8 g/cm³. For example, the polymer particles after drying, after pyrolyzing, and/or after activation can have a real density of about 0.05 g/cm³ to about 1 g/cm³, about 0.5 g/cm³ to about 1.8 g/cm³, about 0.8 g/cm³ to about 1.6 g/cm³, or about 0.3 g/cm³ to about 1.7 g/cm³.

If an electrochemical modifier is used in making the polymer particles in gel form, the electrochemical modifier can be incorporated within the pore structure and/or on the surface of the polymer particles after drying, after pyrolyzing, and/or after activation or incorporated in any number of other ways. For example, in some embodiments, the polymer particles after drying, after pyrolyzing, and/or after activation can include a coating of the electrochemical modifier (e.g., $Al_2O_3$) at least partially disposed on the surface thereof. In some embodiments, the polymer particles after drying, after pyrolyzing, and/or after activation can include greater than about 100 ppm of an electrochemical modifier.

The electrochemical properties of the polymer particles after drying, after pyrolyzing, and/or after activation can be modified, at least in part, by the amount of the electrochemical modifier in the polymer particles after drying, after pyrolyzing, and/or after activation. Accordingly, in some embodiments, the polymer particles after drying, after pyrolyzing, and/or after activation can include at least 0.1%, at least 0.25%, at least 0.5%, at least 1%, at least 5%, at least 10%, at least 25%, at least 50%, at least 75%, at least 90%, at least 95%, at least 99% or at least 99.5% of the electrochemical modifier. For example, in some embodiments, the polymer particles after drying, after pyrolyzing, and/or after activation can include from about 0.5% and 99.5% carbon and from about 0.5% and 99.5% electrochemical modifier. The percent of the electrochemical modifier is calculated on weight percent basis (wt %). In some other more specific embodiments, the electrochemical modifier is selected from iron, tin, silicon, nickel and manganese.

The total ash content of the polymer particles after drying, after pyrolyzing, and/or after activation may, in some instances, can have an effect on the electrochemical performance of the polymer particles after drying, after pyrolyzing, and/or after activation. Accordingly, in some embodiments, the ash content of the polymer particles after drying, after pyrolyzing, and/or after activation can be from about 0.1% to about 0.001% weight percent ash. For example in some specific embodiments the ash content of the polymer particles after drying, after pyrolyzing, and/or after activation can be less than 0.1%, less than 0.08%, less than 0.05%, less than 0.03%, than 0.025%, less than 0.01%, less than 0.0075%, less than 0.005% or less than 0.001%.

Ash content" refers to the nonvolatile inorganic matter which remains after subjecting a substance to a high decomposition temperature. Herein, the ash content of a carbon material, e.g., the polymer particles after drying, after pyrolyzing, and/or after activation, can be calculated from the total PIXE impurity content as measured by proton induced x-ray emission, assuming that nonvolatile elements are completely converted to expected combustion products (i.e., oxides).

Depending, at least in part, on the end use of the polymer particles in gel form, the polymer particles may be used in the gel form, after drying, after pyrolyzing, after activation, or a combination of particles in the gel form, dried, pyrolyzed, and/or activated can be used in an application. Illustrative applications that can use the polymer particles in gel form, dried, pyrolyzed, and/or activated can include, but are not limited to, insulation, energy, e.g., in capacitors, batteries, and fuel cells, medicine, e.g., drug delivery, transportation, e.g., hydrogen or other fuel storage, sensors, sports, catalysts, hazardous waste water treatment, catalyst supports, sorbents, dielectrics, impedance matcher, detectors, filtrations, ion exchange, high-energy physics applications, waste management, such as adsorption of waste fluids and/or waste gases, and the like.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

About 360 grams of resorcinol, about 10.8 grams of ammonium acetate, about 720 grams of deionized water, and about 253 grams acetic acid were added to a reactor and heated to a temperature of about 45° C. After the mixture was heated to about 45° C., about 531 grams of formaldehyde was slowly added to the reactor over the course of about 60 minutes to provide a reaction mixture. After adding the formaldehyde to the reactor the reaction mixture was pre-reacted until a refractive index of about 1.4078 was reached. The pre-reacted mixture or "pre-polymer" was then cooled down to a temperature of about 25° C. and placed into collection bottles. One collection bottle of the pre-polymer was stored in a cold room at a temperature of about 4° C. to about 5° C. overnight.

The next day about 1.2 liters of WESSON® vegetable oil and were added to a 1 gallon reactor equipped with a heating mantle, a cooling coil, and a mechanical agitator. The vegetable oil was stirred via the mechanical agitator and heated to a temperature of about 80° C. About 205 ml of the pre-polymer was slowly added to the heated vegetable oil such that the temperature of the vegetable oil/pre-polymer mixture maintained a temperature above 75° C. The temperature was controlled with a J-KEM Scientific, Model 250. After adding the pre-polymer the contents of the reactor were stirred for about 1 hour at a temperature of about 80° C. to about 85° C. After about 20 minutes of stirring, the stir dial was adjusted to a 3.3 setting. After about 1 hour of stirring, the contents of the reactor (vegetable oil/polymer particulates) were cooled and transferred into about 3 250 ml bottles and placed in an oven heated to a temperature of about 85° C. Heating the vegetable oil/polymer particulate mixture in the oven further cured the polymer particulates. After about 12 hours the glass jars were removed from the oven and a polymer particle product in gel form (Example 1) was collected. The polymer particles in gel form (Example 1) are shown in FIG. 1. As shown in FIG. 1, the polymer particles in gel form had a cross-sectional length of about 1 mm.

Example II

About 387.12 grams of resorcinol, about 5.43 grams of ammonium acetate, about 1,115.37 grams of deionized water, and about 69.72 grams acetic acid were added to a reactor and heated to a temperature of about 45° C. After the mixture was heated to about 45° C., about 423 grams of formaldehyde was slowly added to the reactor over the course of about 80 minutes to provide a reaction mixture. After adding the formaldehyde to the reactor the reaction mixture was pre-reacted until a refractive index of about 1.3940 was reached. The pre-reacted mixture or "pre-polymer" was then cooled down to a temperature of about 25° C. and placed into collection bottles. One collection bottle of the pre-polymer was stored in a cold room at a temperature of about 4° C. to about 5° C. overnight.

Figure 2:
FIG. 2 is another photograph of polymer particles in gel form made according to one or more embodiments described.

The next day about 250 grams of paraffin oil and a magnetic stir bar were added to a beaker located on a hot plate (Corning PC-351). The magnetic stir bar was started by turning the stir dial to the 2.5 setting and the paraffin oil was heated to a temperature of about 81° C. About 75 grams of the pre-polymer was slowly added to the heated paraffin oil such that the temperature of the paraffin oil/pre-polymer mixture maintained a temperature above 75° C. After adding the pre-polymer the contents of the beaker were stirred for about 2 hours at a temperature of about 80° C. to about 85° C. While the contents of the beaker were stirred the magnetic stir bar stopped rotating for about 20 minutes. During this time period manual stirring was continued using a spatula. After about 2 hours of stirring, the contents of the beaker (paraffin oil/polymer particulates) were cooled and transferred into 2 250 ml glass jars, each holding about 200 ml of the paraffin oil/polymer particulate mixture and placed in an oven heated to a temperature of about 85° C. After about 4 hours and 40 minutes the glass jars were removed from the oven and a polymer particle product in gel form (Example 2) was collected. The polymer particles in gel form (Example 2) are shown in FIG. 2. As shown in FIG. 2, the polymer particles in gel form had a cross-sectional length ranging from about 0.1 mm to about 2.5 mm.

Example III

About 256.96 grams of resorcinol, about 7.19 grams of ammonium acetate, about 366.17 grams of deionized water, and about 89.35 grams acetic acid were added to a reactor and heated to a temperature of about 45° C. After the mixture was heated to about 45° C., about 281 grams of formaldehyde was slowly added to the reactor over the course of about 100 minutes to provide a reaction mixture. After adding the formaldehyde to the reactor the reaction mixture was pre-reacted until a refractive index of about 1.4263 was reached. The pre-reacted mixture or "pre-polymer" was then cooled down to a temperature of about 25° C. and placed into collection bottles. One collection bottle of the pre-polymer was stored in a cold box at a temperature of about 4° C. to about 5° C. overnight.

Figure 3:
FIG. 3 is another photograph of polymer particles in gel form made according to one or more embodiments described.

The next day about 250 grams of paraffin oil and a magnetic stir bar were added to a beaker located on a hot plate (Corning PC-351). The magnetic stir bar was started by turning the stir dial to the 2.5 setting and the paraffin oil was heated to a temperature of about 81° C. About 75 grams of the pre-polymer was slowly added to the heated paraffin oil such that the temperature of the paraffin oil/pre-polymer mixture maintained a temperature above 75° C. After adding the pre-polymer the contents of the beaker were stirred for about 2 hours at a temperature of about 80° C. to about 85° C. While the contents of the beaker were stirred the magnetic stir bar stopped rotating for about 5 minutes. During this time period manual stiffing was continued using a spatula. After about 2 hours of stirring, the contents of the beaker (paraffin oil/polymer particulates) were cooled and transferred into 2 glass jars, each holding about 200 ml of the paraffin oil/polymer particulate mixture and placed in an oven heated to a temperature of about 85° C. After about 6 hours the glass jars were removed from the oven and a polymer particle product in gel form (Example 3) was collected. The polymer particles in gel form (Example 3) are shown in FIG. 3. As shown in FIG. 3, the polymer particles in gel form had a cross-sectional length ranging from about 3 mm to about 7 mm.

Example IV

A pre-polymer was prepared according to the following procedure. About 249.99 grams of resorcinol, about 34.91 grams of ammonium acetate, about 298.71 grams of deionized water, and about 144.82 grams acetic acid were added to a reactor and heated to a temperature of about 45° C. After the mixture was heated to about 45° C., about 251 grams of formaldehyde was slowly added to the reactor over the course of about 80 minutes to provide a reaction mixture. After adding the formaldehyde to the reactor the reaction mixture was pre-reacted until a refractive index of about 1.4332 was reached. The pre-reacted mixture or "pre-polymer" was then cooled down to a temperature of about 25° C. and placed into collection bottles. Two collection bottles (collection bottle A and B) of the pre-polymer were stored in a cold room at a temperature of about 4° C. to about 5° C. overnight.

Figure 4:
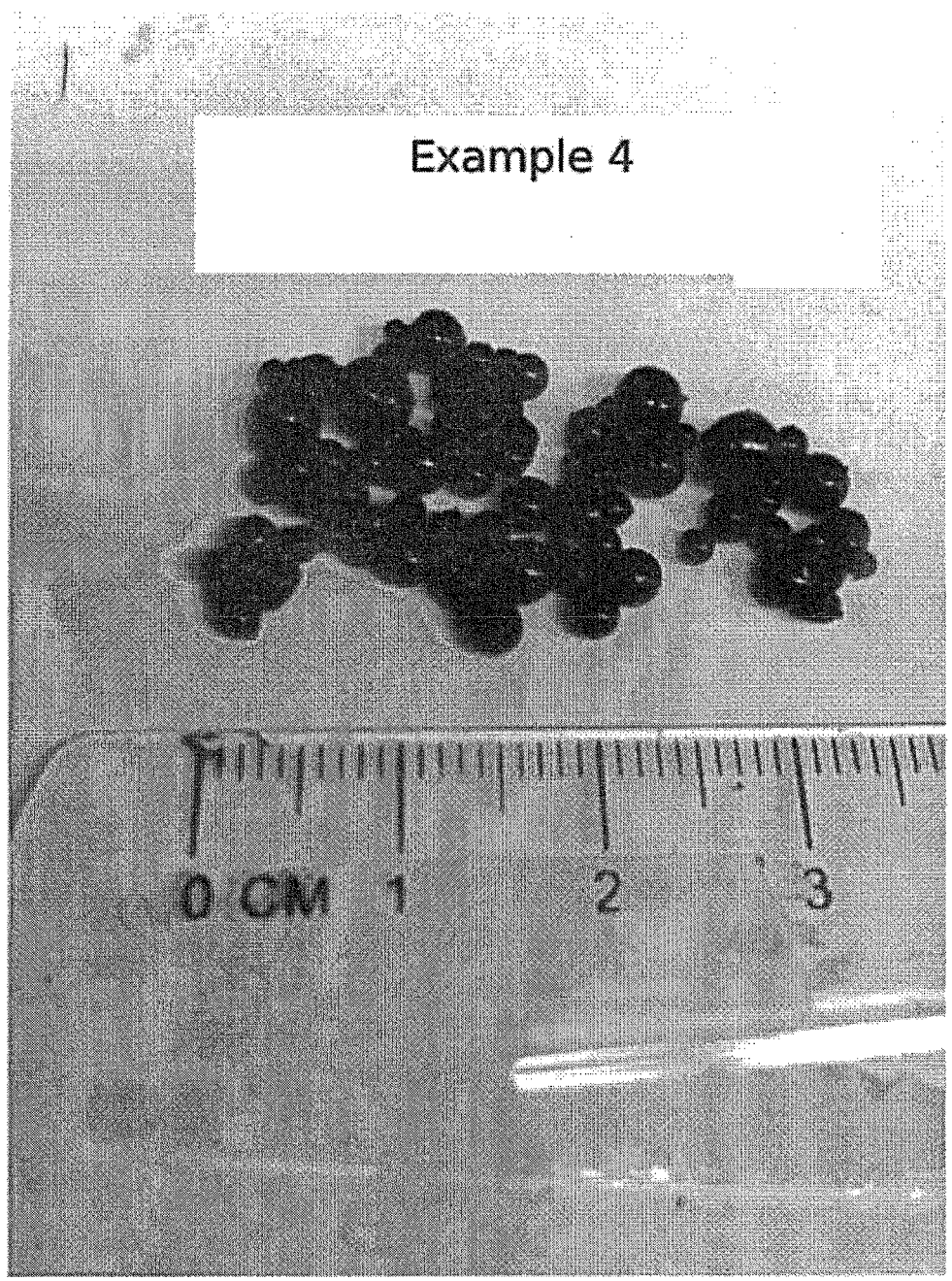
FIG. 4 is yet another photograph of polymer particles in gel form made according to one or more embodiments described.

Polymer particulates in gel form were prepared from the pre-polymer stored overnight in collection bottle A according to the following procedure. The next day about 250 grams of paraffin oil and a magnetic stir bar were added to a beaker located on a hot plate (Corning PC-351). The magnetic stir bar was started by turning the stir dial to the maximum setting and the paraffin oil was heated to a temperature of about 82° C. About 75 grams of the pre-polymer from collection bottle A was slowly added to the heated paraffin oil such that the temperature of the paraffin oil/pre-polymer mixture maintained a temperature above 75° C. After adding the pre-polymer the contents of the beaker were stirred for about 20 minutes at a temperature of about 80° C. to about 85° C. After about 20 minutes of stirring, the solids in the beaker were transferred into a beaker of water heated to a temperature of about 80° C. The solids in the water was stirred for about 1 hour at a temperature of about 80° C. and the contents of the beaker (paraffin oil/polymer particulates) were cooled and transferred into 2 glass jars, each holding about 200 ml of the paraffin oil/polymer particulate mixture and placed in an oven heated to a temperature of about 85° C. After about 15 hours the glass jars were removed from the oven and a polymer particle product in gel form (Example 4) was collected. The polymer particles in gel form (Example 4) are shown in FIG. 4. As shown in FIG. 4, the polymer particles in gel form had a cross-sectional length ranging from about 1 mm to about 4 mm.

Figure 5:
FIG. 5 is still another photograph of polymer particles in gel form made according to one or more embodiments described.

Polymer particulates in gel form were prepared from the pre-polymer stored overnight in collection bottle B according to the following procedure. The next day about 250 grams of paraffin oil and a magnetic stir bar were added to a beaker located on a hot plate (Corning PC-351). The magnetic stir bar was started by turning the stir dial to the maximum setting and the paraffin oil was heated to a temperature of about 97° C. About 75 grams of the pre-polymer from collection bottle A was slowly added to the heated paraffin oil such that the temperature of the paraffin oil/pre-polymer mixture maintained a temperature above 90° C. After adding the pre-polymer the contents of the beaker were stirred for about 15 minutes at a temperature of about 93° C. to about 97° C. and then the temperature was reduced to about 82° C. with stirring continued for about another 15 minutes and the contents of the beaker (paraffin oil/polymer particulates) were cooled and transferred into 2 glass jars, each holding about 200 ml of the paraffin oil/polymer particulate mixture and placed in an oven heated to a temperature of about 85° C. After about 7 hours the glass jars were removed from the oven and a polymer particle product in gel form (Example 5) was collected. The polymer particles in gel form (Example 5) are shown in FIG. 5. As shown in FIG. 5, the polymer particles in gel form had a cross-sectional length ranging from about 0.5 mm to about 3.5 mm.

A Bellingham+Stanley Ltd RFM 330 refractometer was used to determine the refractive index of the pre-polymers in all examples. The refractive index measurement procedure was as follows. Water at a temperature of about 25.0° C. was circulated into the refractometer 1 hr. before each refractive index (RI) measurement. The cleanliness of the prism was checked. If the RI reading of distilled water left from the previous RI measurement was not 1.3325+/−0.0001, the prism and presser were cleaned with distilled water, methanol, IPA (isopropyl alcohol), or other suitable solvent, and the prism was then refilled with distilled water. The presser was immediately closed and the RI measurement was taken. This step was repeated if necessary until the RI reading of distilled water read 1.3325±0.0001. The distilled water on the prism and the presser was wiped off after the refractometer was calibrated. The presser of the refractometer was lifted and the about 0.5 ml to about 1.0 ml of the sample was transferred to the prism with a plastic pipette. For an RI measurement, there must be sufficient sample transferred to the prism such that the entire prism area was covered with the sample. The sample was gently stirred in the prism with the pipet tip to break the surface tension. The presser was then closed and the RI measurement was taken. The temperature displayed by the refractometer was at 25° C.+/−±0.1° C. The preceding procedure was repeated until two successive readings equal to or within 0.0001 RI units were acquired and the average of those two successive readings are the RI values reported herein.

Embodiments described herein further relate to any one or more of the following paragraphs:

1. A method for making polymer particles in gel form via an emulsion or suspension process, the method comprising preparing a reactant mixture comprising a monomer component containing one or more phenolic compounds and one or more crosslinking compounds, and a carrier fluid, wherein the carrier fluid contains less than 0.3 wt % of any surfactant, based on the weight of the carrier fluid, wherein the monomer component polymerizes to form the polymer particles in gel form.

2. A method for making polymer particles in gel form via an emulsion or suspension process, the method comprising preparing a reactant mixture comprising a monomer component containing one or more phenolic compounds and one or more crosslinking compounds, and a carrier fluid, wherein: the carrier fluid contains less than 1 wt % cyclohexane, based on the total weight of the carrier fluid, the monomer component polymerizes to form the polymer particles in gel form, and about 40% or more of the polymer particles in gel form have an average cross-sectional length greater than or equal to 1 mm.

3. A method for making polymer particles in gel form via an emulsion or suspension process, the method comprising: preparing a reactant mixture comprising a monomer component containing one or more phenolic compounds and one or more crosslinking compounds, and a carrier fluid, wherein: the monomer component polymerizes to form the polymer particles in gel form, the reactant mixture is located within a reactor having one or more inner surfaces in contact with the reactant mixture during polymerization of the monomer component, and the one or more inner surfaces limit a release of metal, metal ions, or a combination thereof into the reactant mixture such that the polymer particles in gel form contain less than 1 wt % metal atoms, metal ions, or a combination thereof, based on the total weight of the polymer particles in gel form.

4. A method for making polymer particles in gel form via an emulsion or suspension process, the method comprising: preparing a reactant mixture comprising a carrier fluid and a monomer component containing one or more phenolic compounds and one or more crosslinking compounds, a mixture of Maillard reactants, or a combination thereof, directing the reactant mixture to a reactor comprising one or more reaction loops; polymerizing the monomer component within the reactor to form the polymer particles in gel form; and recovering the polymer particles in gel form from the reactor.

5. A method for making polymer particles in gel form via an emulsion or suspension process, the method comprising preparing a reactant mixture comprising a mixture of Maillard reactants and a carrier fluid, wherein the mixture of Maillard reactants polymerize to form the particles in gel form.

6. The method according to any one of paragraphs 1 to 4, wherein the one or more phenolic compounds comprises phenol, one or more substituted phenolic compounds, one or more tannins, or any combination thereof.

7. The method according to any one of paragraphs 1 to 4 or 6, wherein the crosslinking compound has the formula RCHO, wherein R is hydrogen or a hydrocarbon radical.

8. The method according to any one of paragraphs 1 to 4, 6, or 7, wherein the crosslinking compound is a multifunctional aldehyde compound.

9. The method according to any one of paragraphs 1 to 4 or 6 to 8, wherein the one or more phenolic compounds comprises 1,3-dihydroxybenzene and the one or more crosslinking compounds comprises formaldehyde.

10. The method according to any one of paragraphs 2 to 9, wherein the carrier fluid contains less than 0.3 wt % of any surfactant, based on the weight of the carrier fluid.

11. The method according to any one of paragraphs 1 to 10, wherein the carrier fluid contains less than 0.1 wt % of any surfactant, based on the weight of the carrier fluid.

12. The method according to any one of paragraphs 1 to 11, wherein the carrier fluid is free of any surfactant.

13. The method according to any one of paragraphs 1 to 12, wherein about 40% or more of the polymer particles in gel form have an average cross-sectional length greater than or equal to 1 mm.

14. The method according to any one of paragraphs 1 to 13, wherein about 50% or more of the polymer particles in gel form have an average cross-sectional length greater than or equal to 1 mm.

15. The method according to any one of paragraphs 1 to 14, wherein about 60% or more of the polymer particles in gel form have an average cross-sectional length greater than or equal to 1 mm.

16. The method according to any one of paragraphs 1 to 15, wherein about 40% or more of the polymer particles in gel form have an average cross-sectional length greater than or equal to 1.1 mm.

17. The method according to any one of paragraphs 1 to 16, wherein about 40% or more of the polymer particles in gel form have an average cross-sectional length greater than or equal to 1.3 mm.

18. The method according to any one of paragraphs 1 to 17, wherein about 40% or more of the polymer particles in gel form have an average cross-sectional length greater than or equal to 1.5 mm.

19. The method according to any one of paragraphs 1 to 18, wherein about 40% or more of the polymer particles in gel form have an average cross-sectional length greater than or equal to 1.7 mm.

20. The method according to any one of paragraphs 1 to 19, wherein the carrier fluid comprises one or more vegetable oils, one or more minerals oils having from about 15 to about 40 carbon atoms, one or more chlorinated hydrocarbons, one or more paraffinic oils, water, or any combination thereof.

21. The method according to any one of paragraphs 1 or 3 to 20, wherein the carrier fluid contains less than 1 wt % cycloalkanes, based on the weight of the carrier fluid.

22. The method according to any one of paragraphs 1 to 21, wherein the carrier fluid contains less than 0.5 wt % cyclohexane.

23. The method according to any one of paragraphs 1 to 22, wherein the carrier fluid is free of cyclohexane.

24. The method according to any one of paragraphs 1 to 23, wherein the carrier fluid has a boiling point of 81° C. or greater at a pressure of 100 kPa.

25. The method according to any one of paragraphs 1 or 3 to 24, wherein the carrier fluid comprises one or more cycloalkanes.

26. The method according to any one of paragraphs 1 to 4 or 6 to 25, wherein the monomer component is combined with a liquid medium.

27. The method according to any one of paragraphs 1 to 4 or 6 to 26, wherein the monomer component is an aqueous mixture.

28. The method according to any one of paragraphs 1 to 27, wherein the reactant mixture further comprises one or more catalysts.

29. The method of paragraph 28, wherein the one or more catalysts has a basic pH.

30. The method of paragraph 28, wherein the one or more catalysts has an acidic pH.

31. The method of paragraph 28, wherein the one or more catalysts comprises sodium hydroxide, sodium carbonate, sodium bicarbonate, magnesium oxide, calcium oxide, barium oxide, zeolite, potassium fluoride, potassium hydroxide, potassium carbonate, potassium bicarbonate, ammonium carbonate, hexamethylenetetramine, acetic acid, hydrochloric acid, sulfuric acid, phosphoric acid, phosphorous acid, sulfonic acid, gallic acid, oxalic acid, picric acid, ammonium acetate, ammonium carbonate, or any combination thereof.

32. The method of paragraph 28, wherein the one or more catalysts comprises a mixture of ammonium acetate and acetic acid.

33. The method according to any one of paragraphs 28 to 32, wherein the one or more catalysts is substantially free of any metal or metal ion.

34. The method according to any one of paragraphs 28 to 32, wherein the one or more catalysts is free of any metal or metal ion.

35. The method according to any one of paragraphs 28 to 34, wherein a molar ratio of the one or more phenolic compounds to the one or more catalysts ranges from about 5 to about 400.

36. The method according to any one of paragraphs 28 to 34, wherein a molar ratio of the one or more phenolic compounds to the one or more catalysts ranges from about 5 to about 100.

37. The method according to any one of paragraphs 28 to 34, wherein a molar ratio of the one or more phenolic compounds to the one or more catalysts ranges from about 5 to about 50.

38. The method according to any one of paragraphs 28 to 34, wherein a molar ratio of the one or more phenolic compounds to the one or more catalysts ranges from about 5 to about 45.

39. The method according to any one of paragraphs 28 to 34, wherein a molar ratio of the one or more phenolic compounds to the one or more catalysts is less than 50.

40. The method according to any one of paragraphs 1 to 39, wherein the polymer particles in gel form are made via the suspension process, the method further comprising agitation of the suspension with a mixer.

41. The method according to paragraph 40, wherein at least a portion of any surface of the mixer that contacts the suspension has undergone at least one of: a passivation process, a pickling process, and a combination thereof.

42. The method according to any one of paragraphs 1 to 41, further comprising separating the polymer particles in gel form from the suspension or the emulsion to provide separated polymer particles in gel form.

43. The method according to any one of paragraphs 1 to 42, further comprising drying the polymer particles in gel form to produce dried polymer particles.

44. The method according to any one of paragraphs 1 to 42, further comprising drying the polymer particles under supercritical conditions to produce dried polymer particles.

45. The method according to any one of paragraphs 1 to 42, further comprising freeze drying the polymer particles to produce dried polymer particles.

46. The method according to any one of paragraphs 1 to 42, further comprising air drying the polymer particles to produce dried polymer particles.

47. The method according to any one of paragraph 41 to 46, wherein the dried polymer particles contain less than 1 wt % of any metal ion, metal atom, or combination thereof.

48. The method according to any one of paragraphs 41 to 46, wherein the dried polymer particles contain less than 0.1 wt % of any metal ion, metal atom, or combination thereof.

49. The method according to any one of paragraphs 1 to 48, wherein the polymer particles in gel form contain less than 1 wt % of any metal ion, metal atom, or combination thereof, based on the total weight of the polymer particles in gel form.

50. The method according to any one of paragraphs 1 to 48, wherein the polymer particles in gel form contain less than 0.1 wt % of any metal ion, metal atom, or combination thereof, based on the total weight of the polymer particles in gel form.

51. The method according to any one of paragraphs 1 to 50, further comprising heating the reactant mixture to a temperature ranging from about 30° C. to about 100° C.

52. The method according to any one of paragraphs 1 to 51, wherein the polymer particles in gel form are made via the emulsion process, and wherein the emulsion process is an inverse emulsion process.

53. The method according to any one of paragraphs 1 to 52, wherein the monomer component has a pH of less than 7 during polymerization.

54. The method according to any one of paragraphs 1 to 53, wherein the monomer component has a pH of about 5 or less during polymerization.

55. The method according to any one of paragraphs 1 to 54, wherein the monomer component has a pH of about 4 or less during polymerization.

56. The method according to paragraph 3 or paragraph 3 and any one of paragraphs 6 to 55, wherein the one or more inner surfaces comprises cobalt, chromium, tungsten, carbon, silicon, iron, manganese, molybdenum, vanadium, nickel, boron, phosphorous, sulfur, titanium, aluminum, copper, tungsten, alloys thereof, or any combination thereof.

57. The method according to any one of paragraph 3 or paragraph 3 and any one of paragraphs 6 to 56, wherein the one or more inner surfaces comprises one or more stainless steels, one or more carbon steels, one or more tool steels, one or more alloy steels, or any combination thereof.

58. The method according to any one of paragraph 3 or paragraph 3 and any one of paragraphs 6 to 57, wherein the one or more inner surfaces comprises a passivated metal surface.

59. The method according to paragraph 58, wherein the passivated metal surface is formed by a carburization process, a boronization process, nitridization process, or a combination thereof.

60. The method according to any one of paragraph 3 or paragraph 3 and any one of paragraphs 6 to 59, wherein the one or more inner surfaces comprises glass.

61. The method according to any one of paragraph 3 or paragraph 3 and any one of paragraphs 6 to 60, wherein the one or more inner surfaces comprises one or more fiber reinforced materials.

62. The method according to paragraph 61, wherein the one or more fiber reinforced materials comprises a fiber reinforced plastic.

63. The method according to paragraph 61 or 62, wherein the one or more fiber reinforced materials comprises one or more polymers.

64. The method according to paragraph 63, wherein the one or more polymers comprises polytetrafluoroethylene, polyethylene, polypropylene, chlorinated poly(vinyl chloride), or any combination thereof.

65. The method according to any one of paragraphs 4 or 6 to 64, wherein the reactant mixture is prepared within the reactor by introducing the carrier fluid and the monomer component independently to the reactor at the same location.

66. The method according to any one of paragraphs 4 or 6 to 65, wherein the reactant mixture is prepared within the reactor by introducing the carrier fluid and the monomer component independently to the reactor at different locations with respect to one another.

67. The method according to any one of paragraphs 4 or 6 to 66, wherein the reactor comprises at least two reaction loops.

68. The method according to any one of paragraphs 4 or 6 to 67, wherein the reactor comprises at least three reaction loops.

69. The method according to any one of paragraphs 4 or 6 to 68, wherein the reaction mixture is continuously introduced to the reactor and the polymer particles in gel form are continuously recovered from the reactor.

70. The method according to any one of paragraphs 4 or 6 to 69, wherein the reactor comprises one or more inner surfaces that contact with the reactant mixture during polymerization of the monomer component, and wherein the one or more inner surfaces limit a release of metal, metal ions, or a combination thereof into the reactant mixture such that the polymer particles in gel form contain less than 1 wt % metal atoms, metal ions, or a combination thereof, based on the total weight of the polymer particles in gel form.

71. The method according to any one of paragraphs 5, 10-25, 28-35, or 40-55, wherein the mixture of Maillard reactants comprises a reducing sugar and an amine reactant, a pre-reacted product of the reducing sugar and the amine reactor, or a combination thereof.

72. The method according to any one of paragraphs 5, 10-25, 28-35, 40-55, or 71 the reducing sugar is a monosaccharide, a polysaccharide, or a combination thereof.

73. The method according to any one of paragraphs 5, 10-25, 28-35, 40-55, 71, or 72, wherein the reducing sugar is a monosaccharide selected from the group consisting of: a triose, a tetrose, a pentose, a hexose, a heptose, and a combination thereof.

74. The method according to any one of paragraphs 5, 10-25, 28-35, 40-55, 71 to 73, wherein the reducing sugar is selected from the group consisting of: dextrose, fructose, high fructose corn syrup, dihydroxyacetone, erythrulose, ribulose, xylulose, psicose, sorbose, tagatose, glyceraldehyde, erythrose, threose, ribose, arabinose, xylose, allose, altrose, mannose, gulose, galactose, talose, maltose, cellobiose, lactose, gentiobiose, and a combination thereof.

75. The method according to any one of paragraphs 5, 10-25, 28-35, 40-55, 71 to 74, wherein the amine reactant is selected from the group consisting of: ammonia, ammonium hydroxide, hydrazine, guanidine, primary amines, secondary amines, quaternary ammonium compounds, polyamines, amino acids, proteins, and a combination thereof.

76. The method according to any one of paragraphs 5, 10-25, 28-35, 40-55, 71 to 75, wherein the amine reactant is ammonium hydroxide, and wherein the reducing sugar is a monosaccharide, a polysaccharide, or a combination thereof.

77. The method according to any one of paragraphs 5, 10-25, 28-35, 40-55, 71 to 76, wherein the mixture of Maillard reactants further comprises one or more non-carbohydrate polyhydroxy reactants.

78. The method according to paragraph 77, wherein the one or more non-carbohydrate polyhydroxy reactants comprises trimethylolpropane, glycerol, pentaerythritol, polyvinyl alcohol, partially hydrolyzed polyvinyl acetate, fully hydrolyzed polyvinyl acetate, and mixtures thereof.

79. The method according to any one of paragraphs 5, 10-25, 28-35, 40-55, 71 to 78, wherein the carrier fluid contains less than 0.3 wt % of any surfactant, based on the total weight of the carrier fluid.

80. The method according to any one of paragraphs 5, 10-25, 28-35, 40-55, 71 to 79, wherein the carrier fluid is free of any surfactant.

81. The method according to any one of paragraphs 5, 10-25, 28-35, 40-55, 71 to 80, the reactant mixture is located within a reactor having one or more inner surfaces in contact with the reactant mixture during polymerization of the mixture of Maillard reactants, the wherein one or more inner surfaces limit a release of metal, metal ions, or a combination thereof into the reactant mixture such that the polymer particles in gel form contain less than 1 wt % metal atoms, metal ions, or a combination thereof, based on the total weight of the polymer particles in gel form.

82. The method according to paragraph 81, wherein the one or more inner surfaces comprises cobalt, chromium, tungsten, carbon, silicon, iron, manganese, molybdenum, vanadium, nickel, boron, phosphorous, sulfur, titanium, aluminum, copper, tungsten, alloys thereof, or any combination thereof.

83. The method according to paragraph 81, wherein the one or more inner surfaces comprises one or more stainless steels, one or more carbon steels, one or more tool steels, one or more alloy steels, or any combination thereof.

84. The method according to any one of paragraphs 5, 10-25, 28-35, 40-55, 71 to 83, wherein the one or more inner surfaces comprises a passivated metal surface.

85. The method according to paragraph 84, wherein the passivated metal surface is formed by a carburization process, a boronization process, nitridization process, or a combination thereof.

86. The method according to any one of paragraphs 81 to 85, wherein the one or more inner surfaces comprises glass.

87. The method according to any one of paragraphs 81 to 86, wherein the one or more inner surfaces comprises one or more fiber reinforced materials.

88. The method according to any one of paragraphs 81 to 87, wherein the one or more fiber reinforced materials comprises a fiber reinforced plastic.

89. The method according to paragraph 88, wherein the one or more fiber reinforced materials comprises one or more polymers.

90. The method according to paragraph 89, wherein the one or more polymers comprises polytetrafluoroethylene, polyethylene, polypropylene, chlorinated poly(vinyl chloride), or any combination thereof.

91. The method according to any one of paragraphs 1 to 90, wherein the carrier fluid comprises water.

92. The method according to any one of paragraphs 1 to 90, wherein the carrier fluid contains at least 50 wt % water, based on the total weight of the carrier fluid.

93. The method according to any one of paragraphs 1 to 90, wherein the carrier fluid contains at least 75 wt % water, based on the total weight of the carrier fluid.

94. The method according to any one of paragraphs 1 to 90, wherein the carrier fluid contains at least 90 wt % water, based on the total weight of the carrier fluid.

95. The method according to any one of paragraphs 1 to 90, wherein the carrier fluid contains at least 95 wt % water, based on the total weight of the carrier fluid.

96. The method according to any one of paragraphs 1 to 95, wherein the reactant mixture is at a temperature of about 90° C. or more during polymerization of the monomer component.

97. The method according to any one of paragraphs 1 to 95, wherein the reactant mixture is at a temperature of about 93° C. or more during polymerization of the monomer component.

98. The method according to any one of paragraphs 1 to 95, wherein the reactant mixture is at a temperature of about 95° C. or more during polymerization of the monomer component.

99. The method according to any one of paragraphs 1 to 95, wherein the reactant mixture is at a temperature of about 97° C. or more during polymerization of the monomer component.

100. The method according to any one of paragraphs 1 to 95, wherein the reactant mixture is at a temperature of about 99° C. or more during polymerization of the monomer component.

101. The method according to any one of paragraphs 1 to 95, wherein the reactant mixture is at a temperature of about 100° C. or more during polymerization of the monomer component.

102. The method according to any one of paragraphs 1 to 95, wherein the reactant mixture is at a temperature ranging from about 90° C. to about 150° C. during polymerization of the monomer component.

103. The method according to any one of paragraphs 1 to 95, wherein the reactant mixture is at a temperature ranging from about 95° C. to about 150° C. during polymerization of the monomer component.

104. The method according to any one of paragraphs 1 to 4, 6 to 70, or 91 to 103, wherein the one or more phenolic compounds and the one or more crosslinking compounds are prepolymerized with one another to form a prepolymer prior to making the polymer particles in gel form via the emulsion or suspension process.

105. The method according to any one of paragraphs 1 to 4, 6 to 70, or 91 to 103, wherein the one or more phenolic compounds and the one or more crosslinking compounds are prepolymerized with one another to form a liquid prepolymer having a refractive index ranging from about 1.1000 to about 1.5500 prior to making the polymer particles in gel form via the emulsion or suspension process.

106. The method according to any one of paragraphs 4, 5, 10-25, 28-35, 40-55, and 71 to 103, wherein the mixture of Maillard reactants is pre-reacted prior to making the polymer particles in gel form via the emulsion or suspension process.

107. A method for making polymer particles in gel form via an emulsion or suspension process, the method comprising: preparing a reactant mixture comprising a carrier fluid and a monomer component containing one or more phenolic compounds and one or more crosslinking compounds, a mixture of Maillard reactants, or a combination thereof, wherein: the monomer component polymerizes to form the polymer particles in gel form, the reactant mixture is located within a reactor having one or more inner surfaces in contact with the reactant mixture during polymerization of the monomer component, and the one or more inner surfaces limit a release of metal, metal ions, or a combination thereof into the reactant mixture to produce the polymer particles in gel form containing less than 1 wt % metal atoms, metal ions, or a combination thereof, based on the total weight of the polymer particles in gel form.

108. The method according to paragraph 107, wherein the reactant mixture further comprises one or more catalysts; and wherein the one or more catalysts is substantially free of any metal or metal ion.

109. The method according to paragraph 107 or 108, wherein at least a portion of the one or more inner surfaces in contact with the reactant mixture during polymerization of the monomer component has undergone at least one of: a passivation process and a pickling process.

110. The method according to any one of paragraphs 107 to 109, wherein the polymer particles in gel form contain less than 0.1 wt % metal atoms, metal ions, or a combination thereof, based on the total weight of the polymer particles in gel form.

111. The method according to any one of paragraphs 107 to 110, further comprising drying the polymer particles in gel form to produce dried polymer particles, wherein the dried polymer particles contain less than 1 wt % metal atoms, metal ions, or a combination thereof.

112. The method according to any one of paragraphs 107 to 111, further comprising drying the polymer particles in gel form to produce dried polymer particles, wherein the dried polymer particles contain less than 0.1 wt % metal atoms, metal ions, or a combination thereof.

113. The method according to any one of paragraphs 107 to 112, wherein the one or more inner surfaces comprises cobalt, chromium, tungsten, carbon, silicon, iron, manganese, molybdenum, vanadium, nickel, boron, phosphorous, sulfur, titanium, aluminum, copper, tungsten, alloys thereof, or any combination thereof.

114. The method according to any one of paragraphs 107 to 113, wherein the one or more inner surfaces comprises one or more stainless steels, one or more carbon steels, one or more tool steels, one or more alloy steels, or any combination thereof.

115. The method according to any one of paragraphs 107 to 114, wherein the one or more inner surfaces in contact with the reactant mixture comprises a metal, wherein at least a portion of the one or more inner surfaces in contact with the reactant mixture during polymerization of the monomer component has undergone a passivation process to produce a passivated metal surface, and wherein the passivated metal surface is formed by a carburization process, a boronization process, a nitridization process, or any combination thereof.

116. The method according to any one of paragraphs 107 to 112, wherein the one or more inner surfaces comprises glass.

117. The method according to any one of paragraphs 107 to 112, wherein the one or more inner surfaces comprises one or more fiber reinforced materials.

118. The method according to any one of paragraphs 107 to 112, wherein the one or more fiber reinforced materials comprises a fiber reinforced plastic.

119. The method according to paragraph 118, wherein the one or more fiber reinforced materials comprises one or more polymers.

120. The method according to paragraph 119, wherein the one or more polymers comprises polytetrafluoroethylene, polyethylene, polypropylene, chlorinated poly(vinyl chloride), or any combination thereof.

121. The method according to any one of paragraphs 107 to 112, wherein the one or more inner surfaces comprises a passivated metal surface.

122. The method according to paragraph 121, wherein the passivated metal surface is formed by a carburization process, a boronization process, nitridization process, or a combination thereof.

123. A method for making polymer particles in gel form via an emulsion or suspension process, the method comprising: preparing a reactant mixture comprising a carrier fluid and a monomer component containing one or more phenolic compounds and one or more crosslinking compounds, a mixture of Maillard reactants, or a combination thereof, directing the reactant mixture to a reactor comprising one or more reaction loops; polymerizing the monomer component within the reactor to form the polymer particles in gel form; and recovering the polymer particles in gel form from the reactor.

124. The method according to paragraph 123, wherein the reactant mixture is prepared within the reactor by introducing the carrier fluid and the monomer component independently to the reactor at the same location.

125. The method according to paragraph 123 or 124, wherein the reactant mixture is prepared within the reactor by introducing the carrier fluid and the monomer component independently to the reactor at different locations with respect to one another.

126. The method according to paragraph 123 or 125, wherein the reactor comprises at least two reaction loops.

127. The method according to paragraph 123 or 126, wherein the reactor comprises at least three reaction loops.

128. The method according to paragraph 123 or 127, wherein the reaction mixture is continuously introduced to the reactor and the polymer particles in gel form are continuously recovered from the reactor.

129. A method for making polymer particles in gel form via an emulsion or suspension process, the method comprising: preparing a reactant mixture comprising a mixture of Maillard reactants and a carrier fluid; and polymerizing the mixture of Maillard reactants to form the polymer particles in gel form.

130. The method according to paragraph 129, wherein the mixture of Maillard reactants comprises one or more amine reactants and one or more reducing sugars.

131. The method according to paragraph 129 or 130, wherein the particles in gel form have an average cross-sectional length of about 0.1 mm or more.

132. The method according to any one of paragraph 129 to 131, wherein the particles in gel form have an average cross-sectional length of about 0.5 mm or more.

133. The method according to any one of paragraph 129 to 132, wherein the particles in gel form have an average cross-sectional length of about 1 mm or more.

134. The method according to any one of paragraph 129 to 133, wherein the carrier fluid contains a surfactant.

135. The method according to any one of paragraph 129 to 134, wherein the carrier fluid contains less than 1 wt % mineral oil and paraffin oil, based on the total weight of the carrier fluid.

136. The method according to any one of paragraph 129 to 135, wherein the carrier fluid comprises one or more vegetable oils, one or more minerals oils having from about 15 to about 40 carbon atoms, one or more chlorinated hydrocarbons, one or more paraffinic oils, or any combination thereof.

137. The method according to any one of paragraph 129 to 136, wherein polymerizing the mixture of Maillard reactants comprises heating the mixture of Maillard reactants to a temperature ranging from about 30° C. to about 150° C.

138. The method according to any one of paragraph 129 to 137, further comprising heating the polymer particles in gel form in an inert atmosphere at temperatures ranging from 500° C. to 2400° C.

139. The method according to any one of paragraph 129 to 137, further comprising heating the polymer particles in gel form in an inert atmosphere at temperatures ranging from 500° C. to 2,400° C. to produce pyrolyzed particles; and activating the pyrolzyed particles in an atmosphere comprising carbon dioxide, carbon monoxide, steam, oxygen, or any mixture thereof at a temperature may ranging from 800° C. to 1300° C.

140. The method according to any one of paragraph 129 to 139, wherein the mixture of Maillard reactants comprises one or more amine reactants and one or more reducing sugars, and wherein the reducing sugar is selected from the group consisting of: dextrose, fructose, high fructose corn syrup, dihydroxyacetone, erythrulose, ribulose, xylulose, psicose, sorbose, tagatose, glyceraldehyde, erythrose, threose, ribose, arabinose, xylose, allose, altrose, mannose, gulose, galactose, talose, maltose, cellobiose, lactose, and gentiobiose, and wherein the amine reactant is selected from the group consisting of: ammonia, ammonium hydroxide, hydrazine, guanidine, primary amines, secondary amines, quaternary ammonium compounds, polyamines, amino acids, and proteins.

141. The method according to any one of paragraph 129 to 140, wherein the mixture of Maillard reactants comprises one or more amine reactants and one or more monosaccharides, and wherein the one or more monosaccharides is selected from the group consisting of: a triose, a tetrose, a pentose, a hexose, a heptose, and any mixture thereof.

142. The method according to any one of paragraph 129 to 141, wherein the mixture of Maillard reactants comprises one or more amine reactants, one or more reducing sugars, and one or more non-carbohydrate polyhydroxy reactants.

143. The method according to paragraph 142, wherein the one or more non-carbohydrate polyhydroxy reactants is selected from the group consisting of: trimethylolpropane, glycerol, pentaerythritol, partially hydrolyzed polyvinyl acetate, fully hydrolyzed polyvinyl acetate, and any mixture thereof.

144. The method according to any one of paragraph 129 to 143, wherein the mixture of Maillard reactants comprises one or more amine reactants and one or more reducing sugars, and wherein the reducing sugar contains one or more aldehyde moieties that is reactive with $Cu^{+2}$ to produce a carboxylic acid moiety.

145. The method according to any one of paragraphs 1 to 144, wherein the carrier fluid comprises one or more hydrocarbons having at least 8, at least 10, at least 12, at least 14, at least 16, at least 18, at least 20, at least 22, at least 24, at least 26, at least 28, at least 30, at least 32, at least 34, at least 36, at least 38, or at least 40 carbon atoms.

146. The method according to any one of paragraphs 1 to 144, wherein the carrier fluid comprises one or more hydrocarbons having at least 8, at least 10, at least 12, at least 14, at least 16, at least 18, at least 20, at least 22, at least 24, at least 26, at least 28, at least 30, at least 32, at least 34, at least 36, at least 38, or at least 40 carbon atoms, and wherein the one or more hydrocarbon is present in an amount of at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %.

147. The method according to any one of paragraphs 1 to 144, wherein the carrier fluid comprises one or more hydrocarbons having at least 8, at least 10, at least 12, at least 14, at least 16, at least 18, at least 20, at least 22, at least 24, at least 26, at least 28, at least 30, at least 32, at least 34, at least 36, at least 38, at least 40 carbon atoms, or any combination thereof, and wherein the one or more hydrocarbon is present in an amount of at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:
1. A method for making polymer particles in gel form via an emulsion or suspension process, the method comprising:
preparing a reactant mixture comprising a carrier fluid and a monomer component containing one or more phenolic compounds, wherein:
the monomer component polymerizes to form the polymer particles in gel form,
the reactant mixture is located within a reactor having one or more inner surfaces in contact with the reactant mixture during polymerization of the monomer component,
the one or more inner surfaces limit a release of metal, metal ions, or a combination thereof into the reactant mixture to produce the polymer particles in gel form containing less than 1 wt % metal atoms, metal ions, or a combination thereof, based on the total weight of the polymer particles in gel form,
the one or more inner surfaces in contact with the reactant mixture comprises a metal,
at least a portion of the metal has undergone a passivation process to produce a passivated metal surface, and
the passivated metal surface is formed by a carburization process, a boronization process, a nitridization process, or any combination thereof.

2. The method of claim 1, wherein the reactant mixture further comprises one or more catalysts; and wherein the one or more catalysts is substantially free of any metal or metal ion.
3. The method of claim 1, wherein the polymer particles in gel form contain less than 0.1 wt % metal atoms, metal ions, or a combination thereof, based on the total weight of the polymer particles in gel form.
4. The method of claim 1, further comprising drying the polymer particles in gel form to produce dried polymer particles, wherein the dried polymer particles contain less than 1 wt % metal atoms, metal ions, or a combination thereof.
5. The method of claim 1, further comprising drying the polymer particles in gel form to produce dried polymer particles, wherein the dried polymer particles contain less than 0.1 wt % metal atoms, metal ions, or a combination thereof.
6. The method of claim 1, wherein the metal comprises cobalt, chromium, tungsten, carbon, silicon, iron, manganese, molybdenum, vanadium, nickel, boron, phosphorous, sulfur, titanium, aluminum, copper, tungsten, alloys thereof, or any combination thereof.
7. The method of claim 1, wherein the metal comprises one or more stainless steels, one or more carbon steels, one or more tool steels, one or more alloy steels, or any combination thereof.
8. The method of claim 1, wherein the passivated metal surface is formed by a carburization process.
9. The method of claim 1, wherein the passivated metal surface is formed by a boronization process.
10. The method of claim 1, wherein the passivated metal surface is formed by a nitridization process.
11. The method of claim 1, wherein the one or more phenolic compounds comprise phenol, resorcinol, catechol, hydroquinone, pyrogallol, a tannin, or any combination thereof.
12. The method of claim 11, wherein the monomer component further comprises a crosslinking compound, and wherein the crosslinking compound comprises formaldehyde, paraformaldehyde, acetaldehyde, propionaldehyde, butyraldehyde, furfuraldehyde, benzaldehyde, glyoxal, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, glyoxylic acid, a glyoxylic acid ester, a glyoxylic acid amide, 5-(hydroxymethyl)furfural, or any combination thereof.
13. The method of claim 1, wherein the monomer component further comprises a crosslinking compound.
14. The method of claim 1, wherein the monomer component further comprises a mixture of Maillard reactants.
15. The method of claim 1, wherein the carrier fluid comprises water, a paraffinic oil, a naphthenic oil, an aromatic oil, or any combination thereof.
16. A method for making polymer particles in gel form via an emulsion or suspension process, comprising:
mixing a carrier fluid and a monomer component containing one or more phenolic compounds to produce an emulsion or suspension; and
polymerizing the monomer component in the emulsion or suspension to produce the polymer particles in gel form, wherein:
the emulsion or suspension is located within a reactor having one or more inner surfaces in contact with the emulsion or suspension during polymerization of the monomer component, and
at least a portion of the one or more inner surfaces comprises a passivated metal formed by a carburization process, a boronization process, a nitridization process, or any combination thereof.

17. A method for making polymer particles in gel form via an emulsion or suspension process, comprising:
polymerizing a monomer component comprising a phenolic compound and a crosslinking compound to produce the polymer particles in gel form, wherein:
the monomer component is located within a reactor having one or more inner surfaces in contact with the monomer component during polymerization of the monomer component, and
at least a portion of the one or more inner surfaces comprises a passivated metal formed by a carburization process, a boronization process, a nitridization process, or any combination thereof.

18. The method of claim 17, wherein:
the monomer component further comprises a crosslinking compound,
the carrier fluid comprises water, a paraffinic oil, a naphthenic oil, an aromatic oil, or any combination thereof,
the one or more phenolic compounds comprise phenol, resorcinol, catechol, hydroquinone, pyrogallol, a tannin, or any combination thereof, and
the crosslinking compound comprises formaldehyde, paraformaldehyde, acetaldehyde, propionaldehyde, butyraldehyde, furfuraldehyde, benzaldehyde, glyoxal, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, glyoxylic acid, a glyoxylic acid ester, a glyoxylic acid amide, 5-(hydroxymethyl)furfural, or any combination thereof.

19. The method of claim 17, wherein the one or more phenolic compounds comprise phenol, resorcinol, catechol, hydroquinone, pyrogallol, a tannin, or any combination thereof.

20. The method of claim 19, wherein the crosslinking compound comprises formaldehyde, paraformaldehyde, acetaldehyde, propionaldehyde, butyraldehyde, furfuraldehyde, benzaldehyde, glyoxal, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, glyoxylic acid, a glyoxylic acid ester, a glyoxylic acid amide, 5-(hydroxymethyl)furfural, or any combination thereof.

* * * * *